(12) United States Patent
Lunneborg

(10) Patent No.: US 7,420,144 B2
(45) Date of Patent: Sep. 2, 2008

(54) CONTROLLED TORQUE MAGNETIC HEAT GENERATION

(75) Inventor: Timothy W. Lunneborg, Wahpeton, ND (US)

(73) Assignee: MagTec LLC, Fargo, ND (US)

( * ) Notice: Subject to any disclaimer, the term of this patent is extended or adjusted under 35 U.S.C. 154(b) by 0 days.

(21) Appl. No.: 11/243,394

(22) Filed: Oct. 3, 2005

(65) Prior Publication Data

US 2006/0086729 A1 Apr. 27, 2006

Related U.S. Application Data

(63) Continuation-in-part of application No. 11/174,316, filed on Jun. 30, 2005.

(51) Int. Cl.
*H05B 6/38* (2006.01)

(52) U.S. Cl. ........................... 219/628; 219/631

(58) Field of Classification Search .............. 219/631, 219/600, 630, 629, 628, 618; *A05B 6/38*
See application file for complete search history.

(56) References Cited

U.S. PATENT DOCUMENTS

| | | | |
|---|---|---|---|
| 2,566,274 A | | 8/1951 | White et al. |
| 3,014,116 A | | 12/1961 | MacArthur |
| 3,534,197 A | | 10/1970 | Burnett |
| 3,764,767 A | * | 10/1973 | Randolph .............. 219/618 |
| 4,145,591 A | | 3/1979 | Takeda |
| 4,421,967 A | | 12/1983 | Birgel et al. |
| 4,471,191 A | | 9/1984 | Greis et al. |
| 4,486,638 A | | 12/1984 | de Bennetot |
| 4,503,305 A | | 3/1985 | Virgin |
| 4,600,821 A | | 7/1986 | Fichtner et al. |
| 4,614,853 A | | 9/1986 | Gerard et al. |

(Continued)

FOREIGN PATENT DOCUMENTS

GB    2119609 A    11/1983

(Continued)

OTHER PUBLICATIONS

Non-Final Reject mailed Jul. 21, 2007, for related U.S. Appl. No. 10/821,295.

(Continued)

*Primary Examiner*—Daniel Robinson
(74) *Attorney, Agent, or Firm*—Berkeley Law & Technology Group, LLP; Paul J. Fordenbacher, Esq.

(57) ABSTRACT

A magnetic heater is provided having a conductor assembly and a magnet assembly. The magnet assembly is adapted to rotate relative to the conductor assembly about an axis so as to induce eddy currents in the conductor assembly when relative motion is produced between the conductor assembly and first magnet assembly. The conductor assembly is adapted to translate transversely into and out of magnetic engagement with the magnet assembly. In one embodiment, the conductor assembly defines a fluid path therein for the transfer of heat from the conductor assembly to a fluid. The magnetic heater is a component of a heat generation system comprising an internal combustion engine having a drive shaft for rotating the magnet assembly. The heat generated by the magnetic heater, as well as the heat generated by the engine from the engine exhaust and engine cooling system, is combined to heat a fluid.

24 Claims, 29 Drawing Sheets

U.S. PATENT DOCUMENTS

| | | | |
|---|---|---|---|
| 4,635,705 | A | 1/1987 | Kuznetsov |
| 4,687,420 | A * | 8/1987 | Bentley ...................... 417/240 |
| 5,012,060 | A * | 4/1991 | Gerard et al. ............... 219/631 |
| 5,237,144 | A | 8/1993 | Iguchi |
| 5,263,920 | A | 11/1993 | Budza et al. |
| 5,286,942 | A | 2/1994 | McFadden et al. |
| 5,773,798 | A | 6/1998 | Fukumura |
| 5,870,660 | A | 2/1999 | Ito et al. |
| 5,914,065 | A | 6/1999 | Alavi |
| 5,994,681 | A * | 11/1999 | Lloyd ......................... 219/631 |
| 6,011,245 | A | 1/2000 | Bell |
| 6,144,020 | A * | 11/2000 | Usui et al. .................. 219/631 |
| 6,147,336 | A | 11/2000 | Ushijima et al. |
| 6,297,484 | B1 | 10/2001 | Usui et al. |
| 6,489,598 | B1 | 12/2002 | Hielm |
| 6,703,594 | B2 * | 3/2004 | Yablochnikov ............. 219/603 |
| 6,717,118 | B2 | 4/2004 | Pilavdzic et al. |
| 6,969,833 | B2 | 11/2005 | Suzuki |
| 7,009,158 | B2 | 3/2006 | Sekiguchi et al. |
| 2003/0066830 | A1 * | 4/2003 | Reed et al. .................. 219/672 |
| 2005/0006381 | A1 | 1/2005 | Lunneborg |
| 2006/0086729 | A1 * | 4/2006 | Lunneborg .................. 219/628 |

FOREIGN PATENT DOCUMENTS

| | | |
|---|---|---|
| TW | 399829 | 7/2000 |
| WO | PCT/US02/023569 | 7/2002 |

OTHER PUBLICATIONS

Restriction Requirement mailed Dec. 30, 2005, for related U.S. Appl. No. 11/174,316.
Response to Restriction Requirement filed Jan. 30, 2006, for related U.S. Appl. No. 11/174,316.
Supplemental Response to Restriction Requirement filed Mar. 2, 2006, for related U.S. Appl. No. 11/174,316.
Non-Final Office action mailed May 16, 2006, for related U.S. Appl. No. 11/174,316.
Response filed Aug 15, 2006, for related U.S. Appl. No. 11/174,316.
Response filed Aug. 30, 2006, for related U.S. Appl. No. 11/174,316.
Notice of Allowance mailed Mar. 8, 2007, for related U.S. Appl. No. 11/174,316.
Notice of Withdraw from Issue, Mailed Mar. 16, 2007, for related U.S. Appl. No. 11/174,316.
Non-final Office action mailed May 30, 2007, for related U.S. Appl. No. 11/174,316.
International preliminary Examination Report for related application PCT/US02/23569, mailed Nov. 20, 2003.
Written Opinion for related application PCT/US02/23569, mailed Apr. 9, 2003.
Response to Written Opinion for related application PCT/US02/23569, filed Jul. 23, 2003.
U.S. Appl. No. 10/269,690, filed Oct. 2002, Reed et al.
U.S. Appl. No. 60/307,409, filed Jul. 2001, Reed et al.
Office action mailed Jun. 22, 2005, for related U.S. Appl. No. 10/821,295.
Amendment filed Sep. 12, 2005, for related U.S. Appl. No. 10/821,295.
Notice of Non-Compliant Amendment, mailed October 25, 2005, for related U.S. Appl. No. 10/821,295.
Amendment and Response to Non-Compliant Notice, filed Nov. 1, 2005, for related U.S. Appl. No. 10/821,295.
Restriction Requirement mailed Jan. 26, 2006, for related U.S. Appl. No. 10/821,295.
Response to Restriction Requirement filed Sep. 25, 2006, for related U.S. Application. 10/821,295.

* cited by examiner

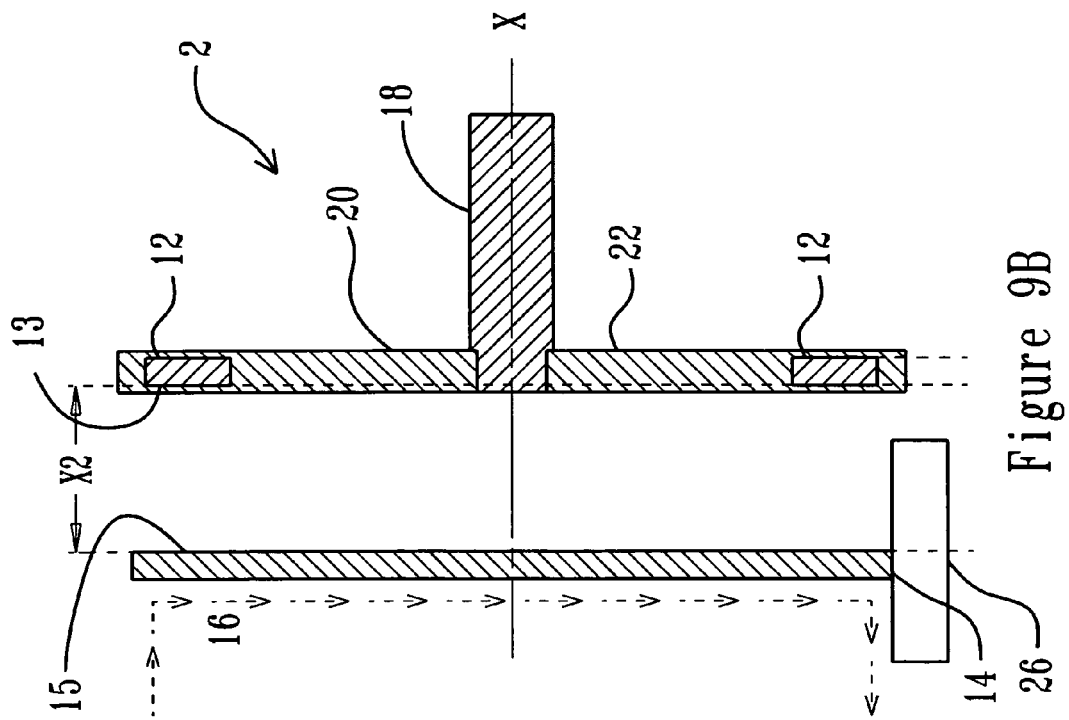
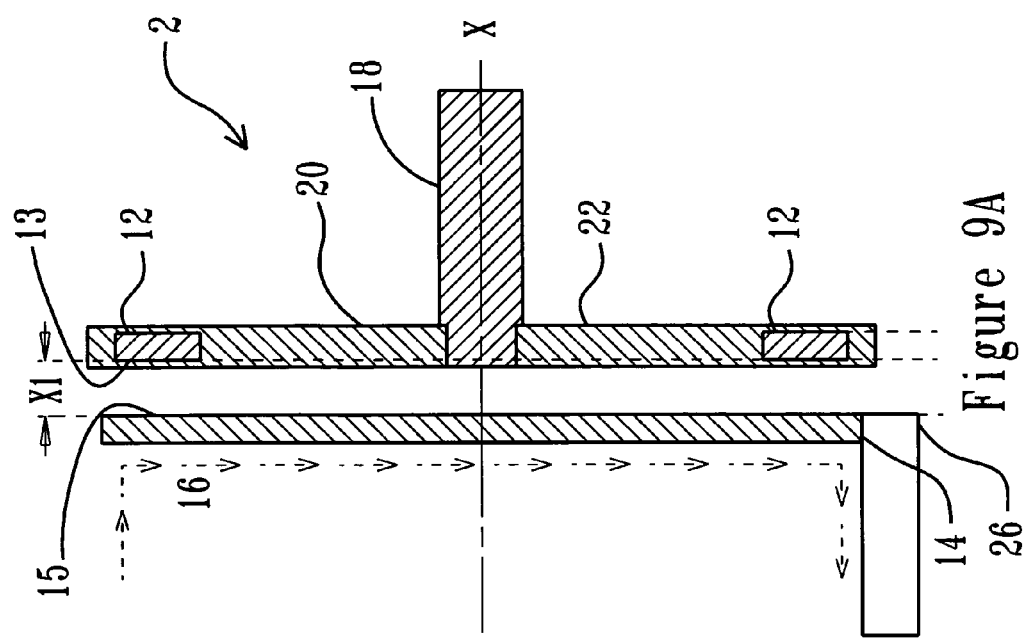

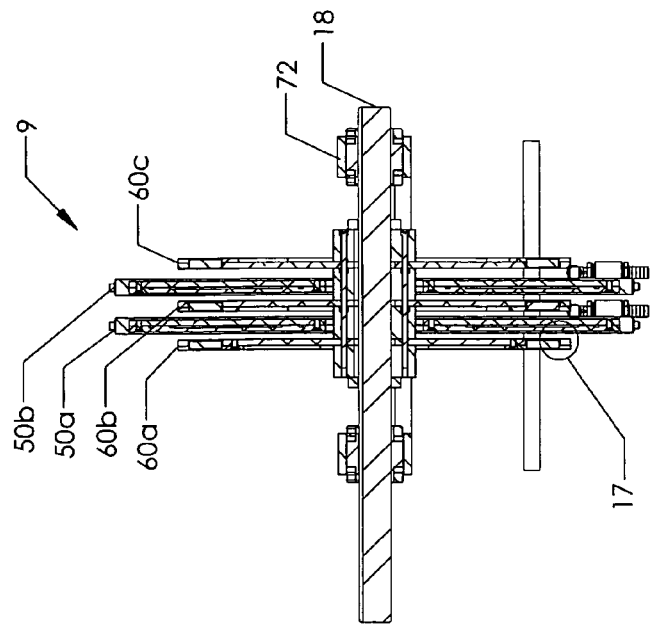
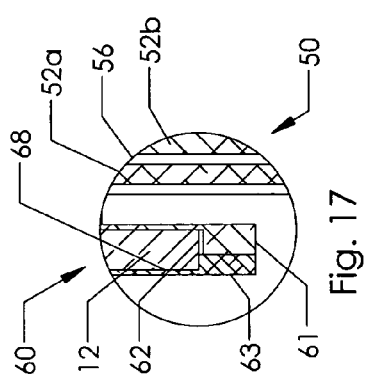
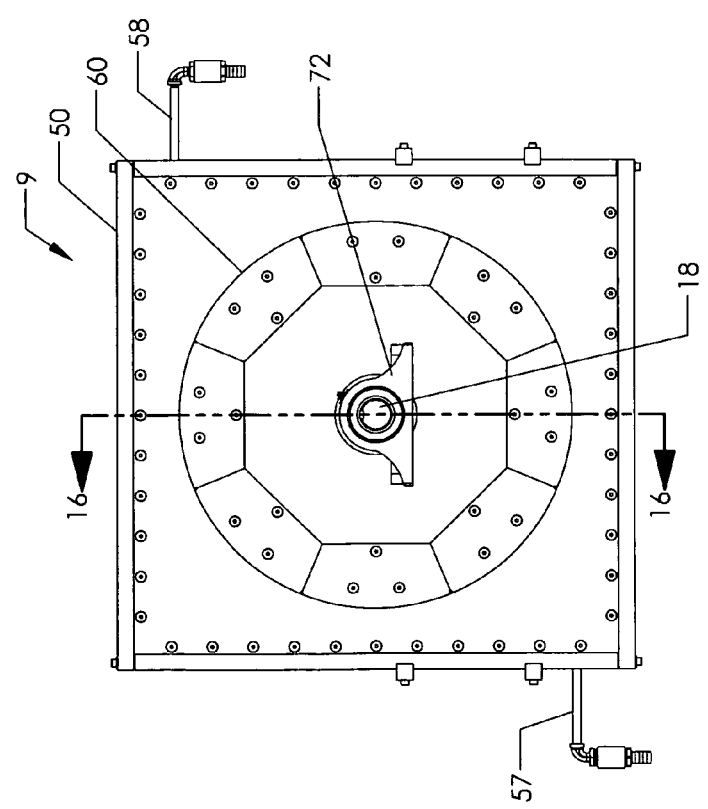
Fig. 16
Fig. 17
Fig. 15

CONTROLLED TORQUE MAGNETIC HEAT GENERATION

RELATED APPLICATIONS

This application is a continuation-in-part claiming benefit under 35 USC § 120 of U.S. Utility application Ser. No. 11/174,316, filed Jun. 30, 2005 and entitled MAGNETIC HEAT GENERATION which is in its entirety incorporated herewith by reference.

FIELD OF THE INVENTION

The present invention is related to devices for the production of heat, and more particularly, to methods and apparatus for generating heat using magnetic induction.

BACKGROUND

A magnetic heater generates heat by a phenomenon known as magnetic inductive heating. Magnetic inductive heating occurs in an electrically conductive member when exposed to a time-varying magnetic field. The varying magnetic field induces eddy currents within the conductive member, thereby heating it. An increase in the magnitude of the variations of the magnetic field increases the rate at which the conductive member is heated. The heated conductive member can then be used as a heat source for various purposes. The heated conductive member is often used to heat a fluid, such as air or water, which is circulated past the conductive member. The heated fluid is then used to transfer the heat from the heater for external use.

One method of exposing a conductive member to a varying magnetic field is to move a magnetic field source relative to the conductive member. This motion may be achieved by arranging magnets around the edge of a circular disk having a rotatable shaft substantially at its center, the flat surface of the disk being opposable to an essentially flat portion of the surface of the conductive member. As the shaft of the disk is rotated, the magnets move relative to the surface of the conductive member. A given point on the conductive member is exposed to a cyclically varying magnetic field as each of the magnets approach, pass over, and retreat from that given point.

The amount of heat induced within the conductive member depends on many factors, some of which include the strength of the magnetic field, the distance between the magnets and the conductive member (referred herein as the "conductor/magnet spacing"), and the relative speed of the magnets to the conductive member.

Conventional magnetic heaters suffer from several disadvantages. For example, many conventional magnetic heaters have limited precision in their control of operational parameters such as the rate of heat generation, the efficiency of heat generation, and the efficiency of heat transfer to the working fluid used to carry the heat.

A magnetic heater is needed that provides one or more of the following: improved control of the rate of heat generation, improved efficiency of heat generation, and improved efficiency of heat transfer to the working fluid used to carry the heat.

BRIEF DESCRIPTION OF THE DRAWINGS

Like reference numbers generally indicate corresponding elements in the figures.

FIGS. 9A and 9B are side views of the magnetic heater comprising a spacing actuator for varying the conductor/magnet spacing, in accordance with an embodiment of the present invention;

FIG. 15 is a front view of a magnetic heater, in accordance with an embodiment of the present invention;

FIG. 16 is a side cross-sectional view of the magnetic heater of FIG. 15 along cut line 16-16;

FIG. 17 is a partial cutaway detailed view of the side cross-sectional view of FIG. 16;

DETAILED DESCRIPTION

Figure 1:
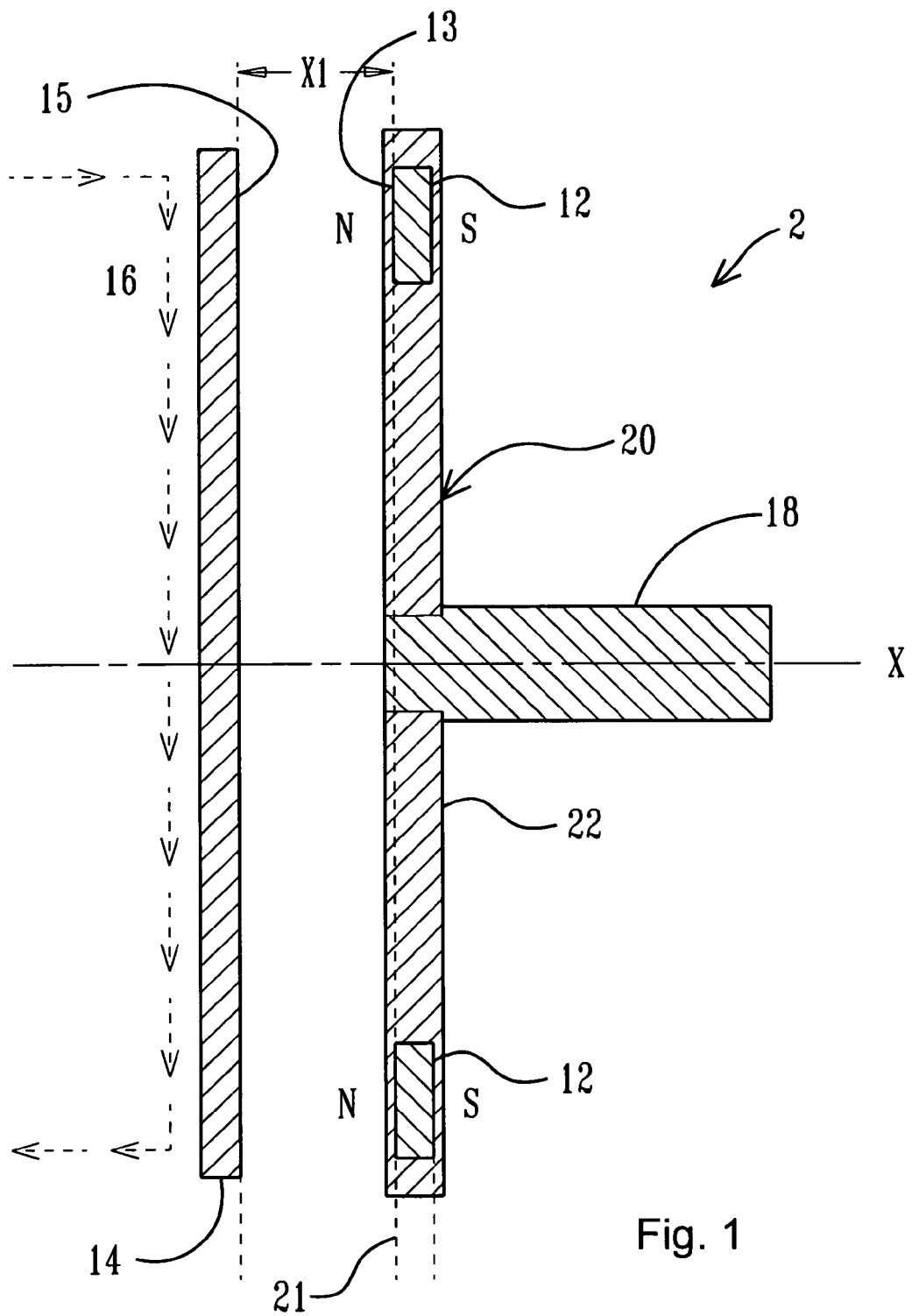
FIG. 1 is a side view of an embodiment of a magnetic heater, in accordance with the present invention.

FIG. 1 is a side view of an embodiment of a magnetic heater 2 in accordance with the present invention. The magnetic heater 2 comprises a magnet assembly 20 and a conductive member 14 disposed proximate the magnet assembly 20. Rotation of the magnet assembly 20 about an x-axis induces a predetermined cyclical variation of magnetic field within the conductive member 14.

Figure 2:
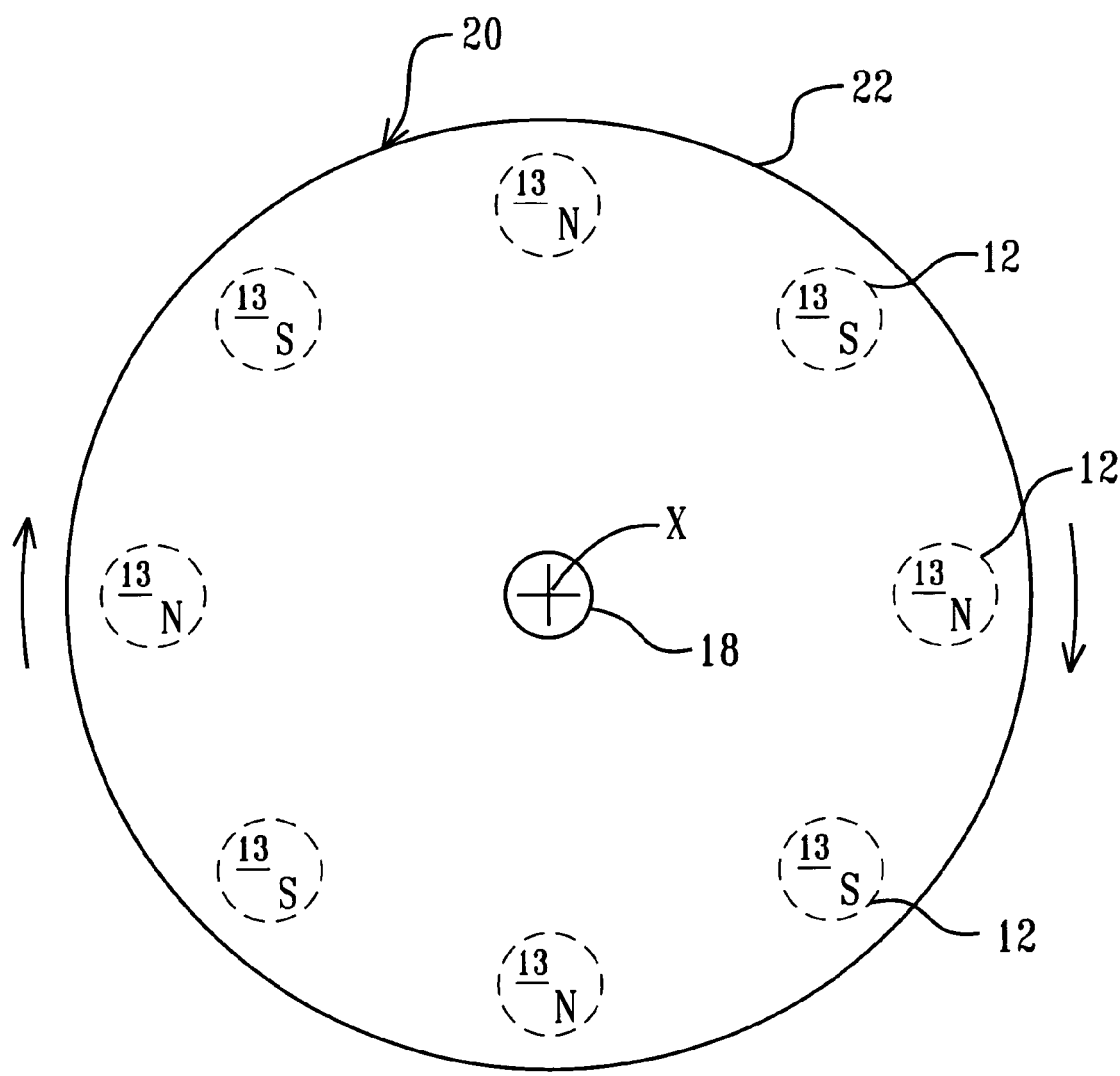
FIG. 2 is a front view of the magnet assembly of FIG. 1.

FIG. 2 is a front view of the magnet assembly 20 of FIG. 1. The magnet assembly 20 comprises a disk-shaped frame 22, a plurality of magnets 12, and a shaft 18. The plurality of magnets 12 are coupled to and arranged in a planar, generally circular, spaced-apart, orientation on the frame 22. The magnets 12 each have a first magnet surface 13 in a substantially planar relationship, referred herein as the first magnet plane 21, shown in FIG. 1. The shaft 18 is coupled substantially at the center of rotation of the frame 22. The center of rotation of the frame 22 defines the x-axis which is substantially perpendicular to the first magnet plane 21. The shaft 18 is adapted to couple with an energy source capable of imparting rotation to the shaft 18.

The conductive member 14 has a planar conductive member first side 15 in opposing, substantially parallel relationship with the first magnet plane 21. The conductive member first side 15 and the first magnetic plane 21 are spaced-apart a predetermined distance in opposing relationship referred herein as a conductor/magnet spacing X1. The conductive member 14 comprises an electrically-conductive material.

As the shaft 18 of the frame 22 is rotated, the magnets 12 move relative to the conductive member first side 15 of the conductive member 14. A given point on the conductive member 14 will, therefore, be exposed to a cyclically varying magnetic field as each of the magnets 12 approach, pass over, and retreat from adjacent that given point. The given point on the conductive member 14 will thus be heated as long as the given point is exposed to the time-varying magnetic field.

It is appreciated that the magnet assembly 20 can comprise one or more magnets 12. One magnet 12 is sufficient to expose a cyclically varying magnetic field onto the conductive member 14. Therefore, it is appreciated that when reference is made to a plurality of magnets 12, it applies also to embodiments comprising one magnet 12, and vice-versa.

In embodiments of the present invention, the magnets 12 are permanent magnets. Therefore, the magnets 12 have a substantially constant magnetic field strength. This is contrasted with an electromagnet, which has the capability of producing a range of magnetic field strength dependent on varying the current driving the electromagnet. Therefore, the strength of the magnetic field produced by the permanent magnets 12 that the conductive member 14 is exposed to primarily depends on the conductor/magnet spacing X1. The magnetic field strength of the permanent magnet 12 is referred to as the absolute magnetic field strength.

A fluid path 16 is defined such that heat transfer between the conductive member 14 and fluid moving within the fluid path 16 is enabled. Thus, as the conductive member 14 is heated, a fluid absorbs at least a portion of the heat generated. The fluid can thus be used to transport the heat to another location.

The radial and axial placement of the magnets 12 about the frame 22 as shown in FIGS. 1 and 2 is exemplary only. Placement of the magnets 12 about the frame 22 in other arrangements, orientations, spacing, among other things, in planar relationship or otherwise, is anticipated suitable for a particular purpose of imparting a magnetic field onto the conductive member 14 and/or onto additional conductive members 14. Furthermore, the magnets 12 need not be of the same size, shape, polar orientation, composition, or type, among other things.

In the embodiment of FIGS. 1 and 2, the magnets 12 are oriented such that the conductive member 14 is exposed to an alternating polarity from adjacent magnets 12, with their north poles N either pointing towards or away from the conductive member 14. Such an arrangement produces a relatively large range of variation in the magnetic field on the conductive member 14 as compared with, for example, wherein all of the magnets 12 present the same polarity to the conductive member 14.

Relative motion between the conductive member 14 and the magnets 12 is produced, wherein the magnets 12, are caused to rotate about the x-axis and holding the conductive member 14 stationary.

Figure 3:
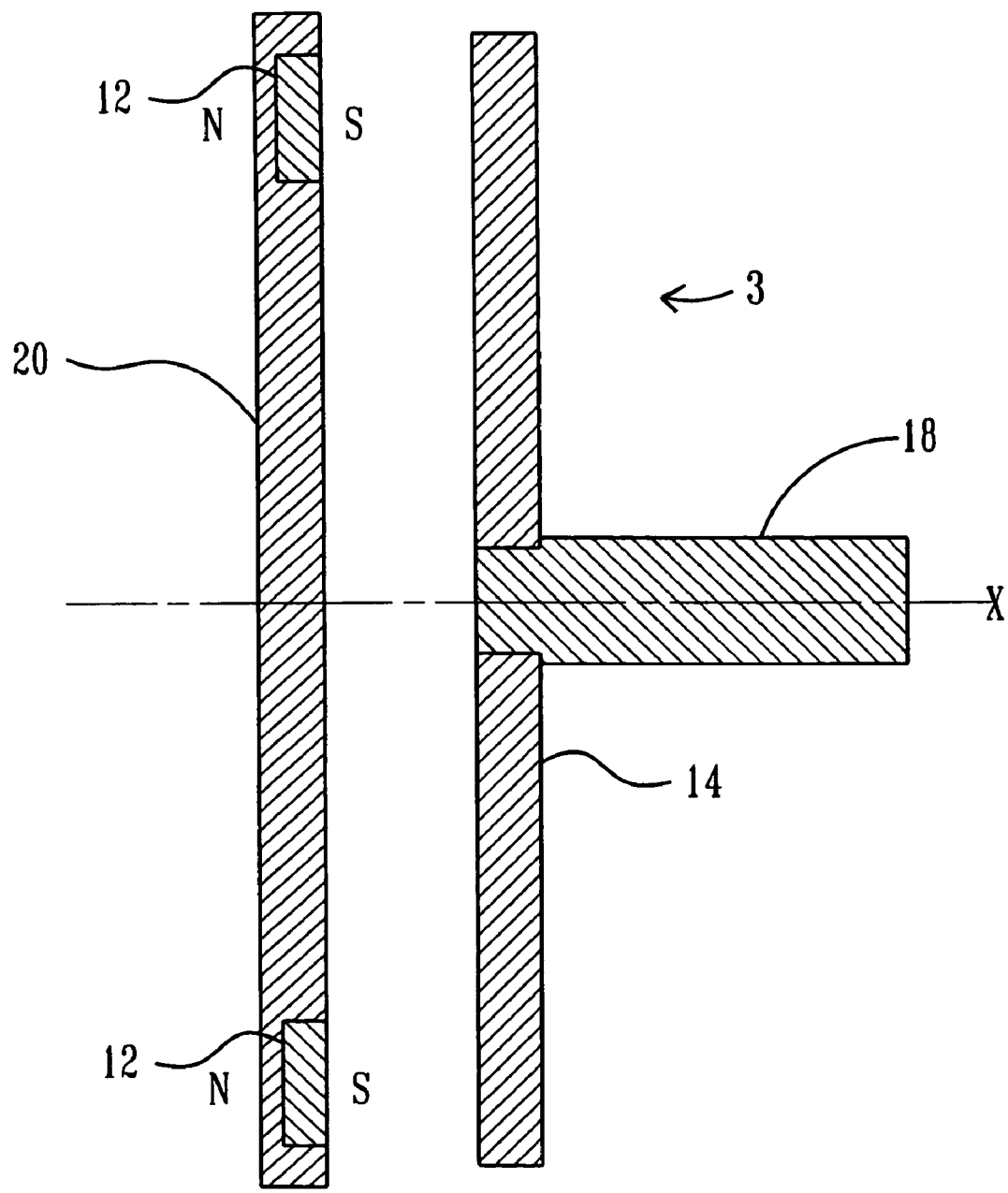
FIG. 3 is a side view of a magnetic heater, in accordance with an embodiment of the present invention.

FIG. 3 is a side cross-sectional view of a magnetic heater 3 wherein the conductive member 14 is caused to rotate about the x-axis and holding the magnet assembly 20, and thus, the magnets 12, stationary. The conductive member 14 is coupled to a shaft 18 that is coupled to an energy source suitable for rotating the shaft 18 about the x-axis.

It is understood that relative motion between the magnets 12 and the conductive member 14 can be produced, in accordance with embodiments of the present invention, by the above mentioned configurations, and by other configurations, such as, but not limited to, rotation of both the magnet assembly 20 and conductive member 14 at different rates in the same direction, and rotation of both the magnet assembly 20 and conductive member 14 in opposite directions.

The absolute magnetic field strength of the magnet 12 is a measure of the magnitude of the magnetic field generated by the magnet 12 at a point on the magnet 12. For permanent magnets, the absolute magnetic field strength is essentially fixed. For electromagnets, the absolute magnetic field strength depends on the amount of current passing through the magnets coils.

The magnetic field exerted on the conductive member 14 depends on, among other things, the absolute magnetic field strength of the magnet 12 and the conductor/magnet spacing X1 between the magnet 12 and the conductive member 14.

A variety of magnets 12 are suitable for embodiments of the present invention. Permanent magnets 12 are advantageous for certain embodiments, for at least the reason that it is not necessary to supply electrical power to the magnets 12, hence no wiring or power source is needed for such purpose.

The rate of heat generation in a magnetic heater 2, 3 in accordance with embodiments of the present invention depends in part on the absolute magnetic field strength of the magnets 12. Therefore, for applications wherein a high rate of heat generation is desirable, it is also desirable that the magnets 12 have a relatively high absolute magnetic field strength.

In addition, the maximum temperature that can be generated by a magnetic heater 2, 3 according to embodiments of the present invention depends in part on the heat tolerance of the magnets 12. Permanent magnets have a "maximum effective operating temperature" above which their magnetic field begins to degrade significantly.

Electromagnets likewise suffer from decreased performance with increasing temperature, though the decrease is not as well defined as that of permanent magnets. For example, the resistance of the magnetic field coils in an electromagnet gradually increases with increasing temperature, which in turn gradually reduces the current flow at a given voltage, generating still more heat. Magnets of both types are available suitable for use at elevated temperatures.

Permanent magnets known as rare earth magnets, such as, but not limited to Samarium Cobalt magnets, have a relatively high absolute magnetic field strength and operating temperature, and are suitable for the particular purpose.

The conductive member 14 comprises an electrically conductive material suitable for the particular purpose. Suitable materials include, but are not limited to, copper, aluminum, alloys of copper, alloys of aluminum, and other metallic or non-metallic, electrically conductive substances. The conductive member 14 is adapted to enable induced eddy-currents within the conductive member 14 when exposed to a time-varying magnetic flux. The conductive member 14 of the embodiment of FIG. 1 is generally disc-shaped. The conductive member 14 is not particularly limited to a specific shape, size, or configuration. In other embodiments, the conductive member is formed in two or more pieces, as a thin conductive layer on a non-conductive substrate, having defined apertures therein, among other configurations.

Figure 4:
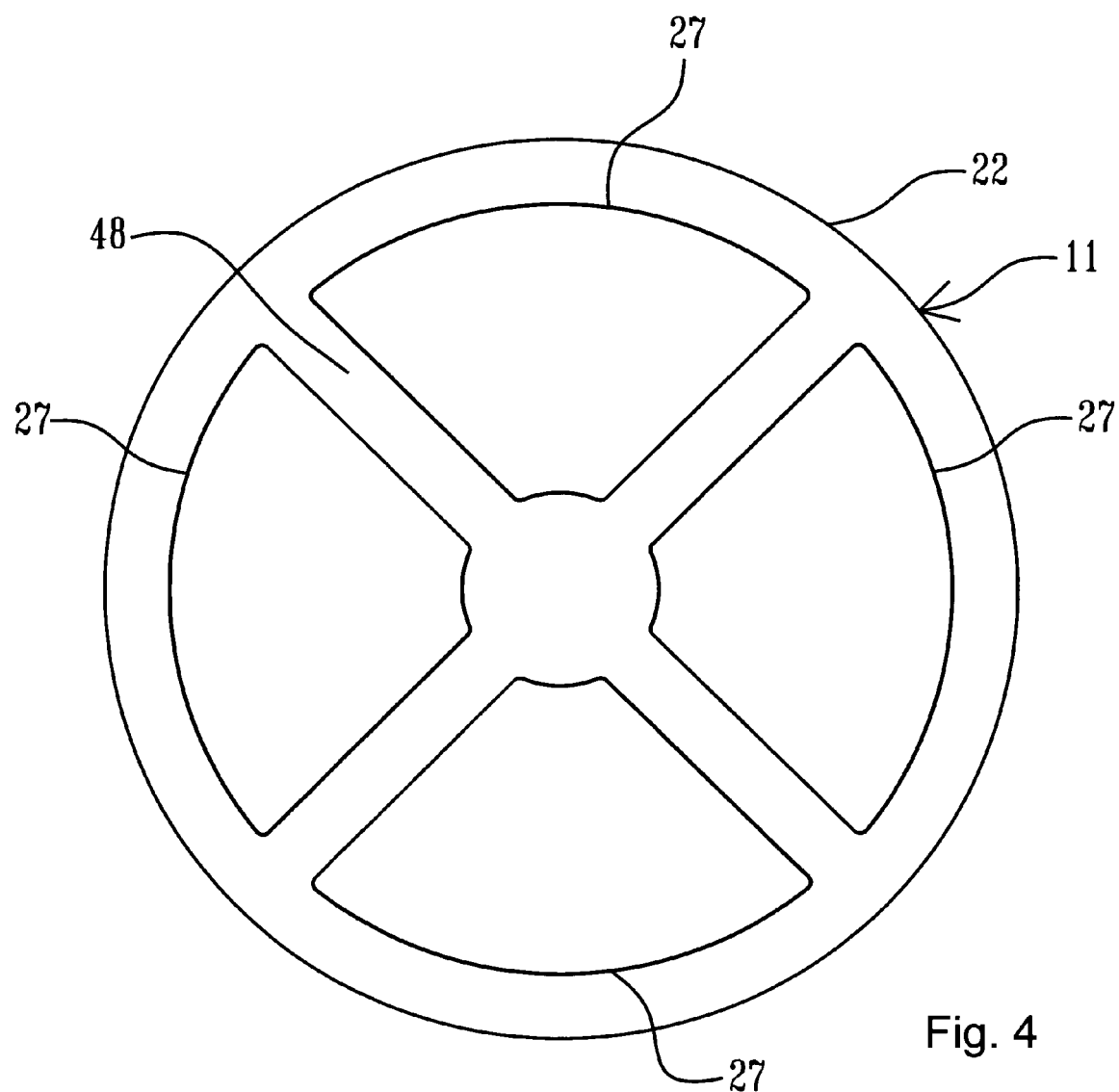
FIG. 4 is a front view of a conductive member comprising a plurality of separate conductors, in accordance with an embodiment of the present invention.

The conductive member need not consist of a closed loop or integral piece of conductive material. FIG. 4 is a front view of a conductive member assembly 11 comprising a plurality of separate conductors 27 that are separated from one another by non-conductive material 48 in accordance with an embodiment of the present invention. In such a case, each conductor 27 is heated independently.

Likewise, the conductive member 14, even if a single contiguous piece of conductive material, might be shaped with apertures, or be constructed of wires, beams, rods, etc., with empty space therebetween.

FIGS. 1 through 3 show the magnetic heater 2, 3 in simplified schematic form for clarity. It is understood that additional structure may be present to provide structural support for containment and alignment.

Figure 5:
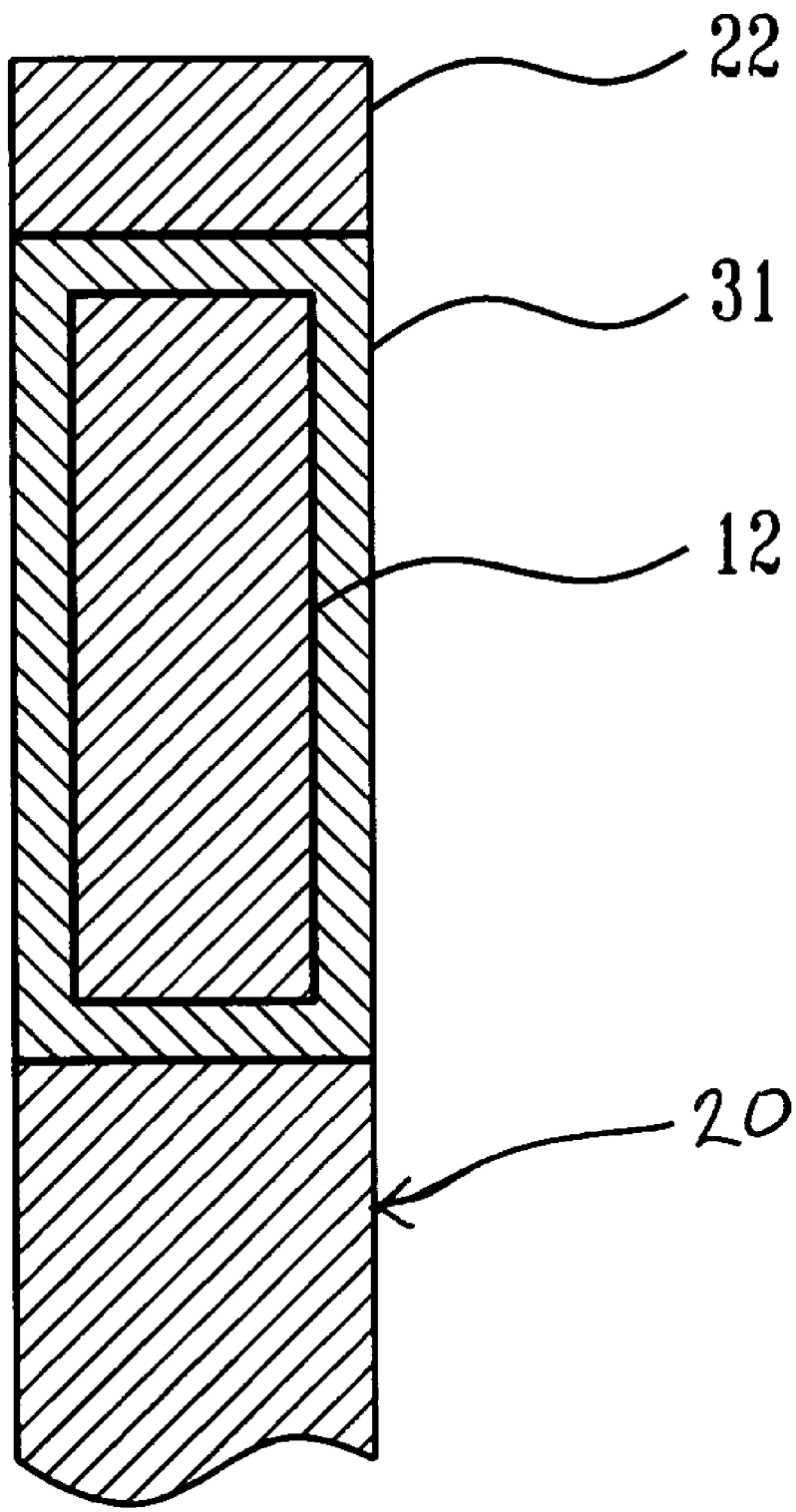
FIG. 5 is a portion of the frame with a cross-sectional view of a magnet and a protective layer provided on the exterior of the magnet, in accordance with an embodiment of the present invention.

FIG. 5 is a cross-sectional view of a portion of the magnet assembly 20 comprising a frame 22 with a magnet 12 and a protective layer 31 provided on the exterior of the magnet 12. The protective layer 31 is selected for a particular purpose, including, but not limited to, thermal protection, additional structural integrity, and chemical protection.

A variety of materials are suitable for use as the protective layer 31, so long as they do not significantly reduce the propagation of the magnetic field of the magnet 12.

In one embodiment, the protective layer 31 comprises aluminum. It is noted that aluminum has a high reflectivity, thus inhibiting the absorption of heat by the magnet 12, and a high infrared emissivity, thus facilitating the rapid re-radiation of heat away from the magnet 12. These properties combine to provide passive cooling for the magnet 12. In addition, aluminum is relatively durable, and so a protective layer 31 of aluminum serves to protect the magnet 12 physically. Likewise, aluminum is relatively impermeable, and thus may effectively seal the magnet 12 against any potential corrosive effects due to moisture, oxygen, fluid flowing through the fluid path 16 (see below), among other things.

In addition, in other embodiments, the magnetic heater 2,3 may include an additional active or passive cooling mechanism for the magnets 12. A wide variety of cooling mechanisms are suitable for the particular purpose. For example, passive cooling mechanisms include, but are not limited to, heat sinks and radiator fins. Active cooling mechanisms include, but are not limited to, coolant loops and refrigeration units.

It is noted that the fluid flow path 16, as described below, may be configured to act as a cooling mechanism. In some embodiments of the present invention, fluid is used to provide a mechanism for absorbing heat from the conductive member 14, and it is well suited for absorbing heat from the magnets 12 as well.

In other embodiments in accordance with the present invention, heat is generated for use via direct conduction or radiation from the conductive member 14. For example, heat could be transferred from the conductive member 14 to a solid heat conductor, heat sink, or heat storage device, such as, but not limited to, a mass of ceramic, brick, stone, etc.

Figure 6:
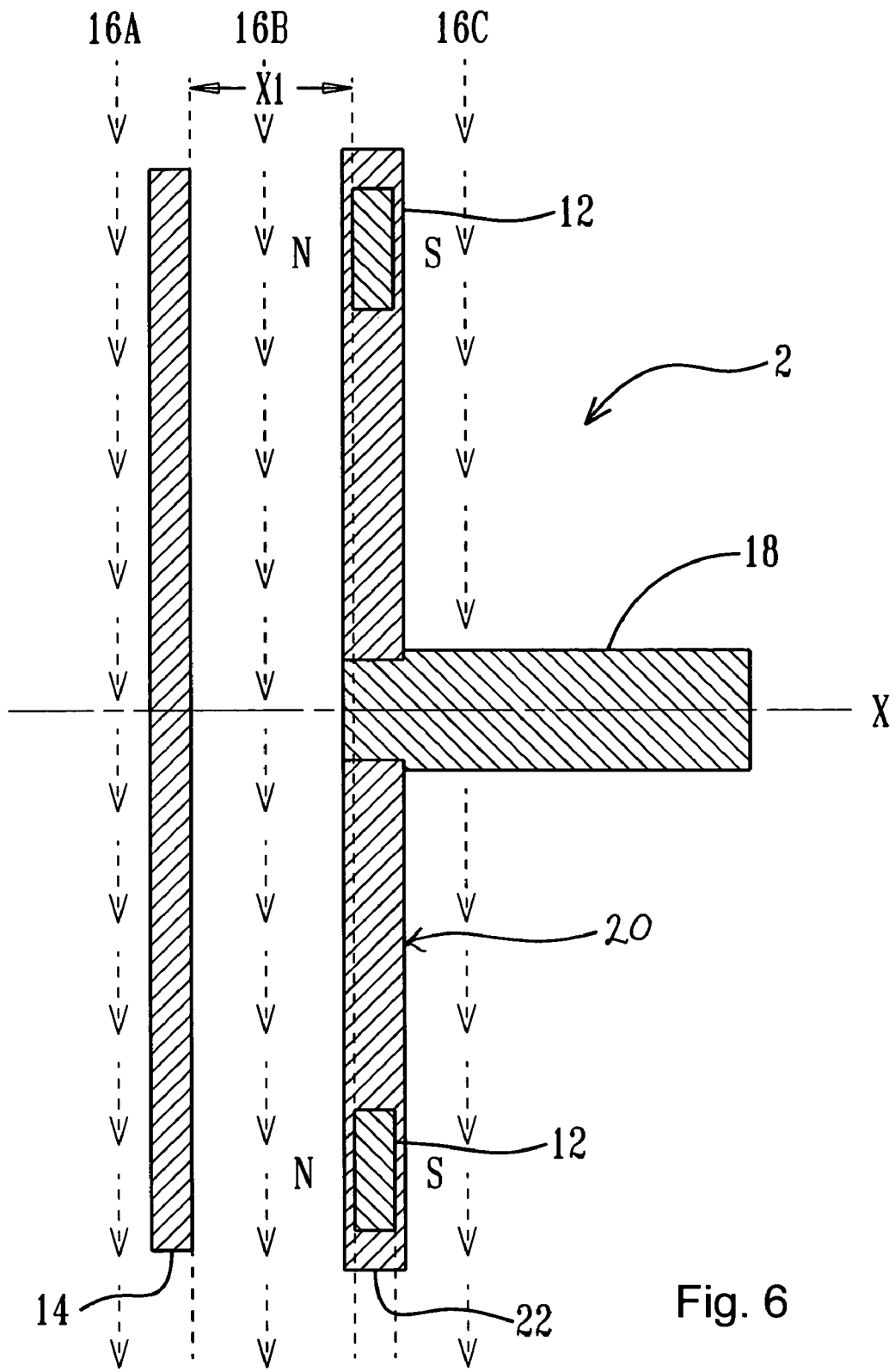
FIG. 6 is a side view of an embodiment of a magnetic heater, in accordance with the present invention.

FIG. 6 is a side cross-sectional view of the magnetic heater 2 wherein the fluid path 16 is defined so that at least a portion thereof extends between the magnets 12 of the magnet assembly 20 and the conductive member 14 in accordance with embodiments of the present invention. The fluid path 16 extends substantially parallel with the conductive member 14 and the magnets 12, between the magnets 12 and the conductive member 14.

Suitable fluids for the particular purpose include, but are not limited to, gaseous fluids such as air and liquid fluids such as water. When the conductive member 14 is heated, fluid in the fluid path 16 receives heat from conductive member 14. Heat transfer from the conductive member 14 to fluid in the fluid path 16 may occur via one or more of conduction, convection, and radiation.

Figure 7:
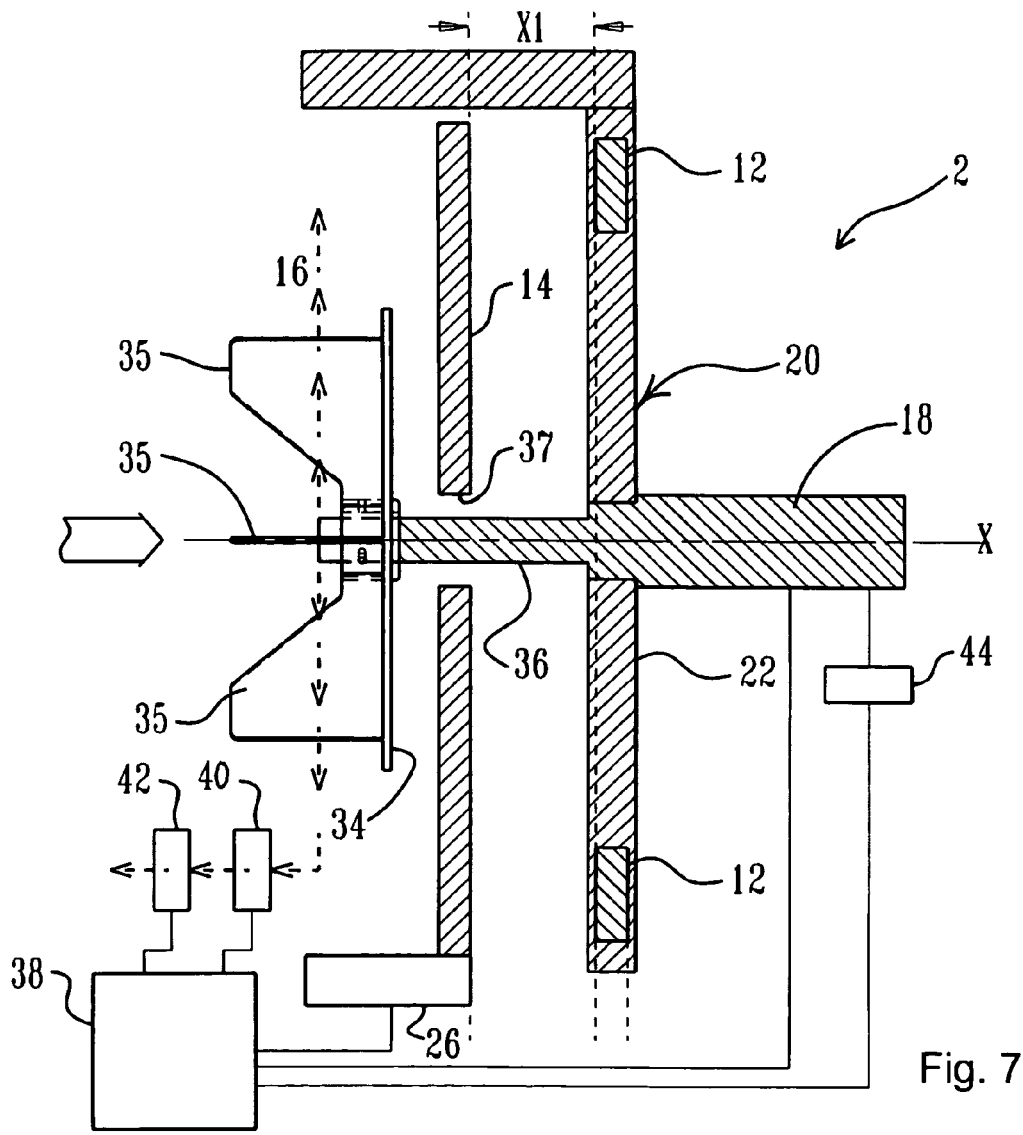
FIG. 7 is a side view of a magnetic heater, in accordance with an embodiment of the present invention.
Figure 8:
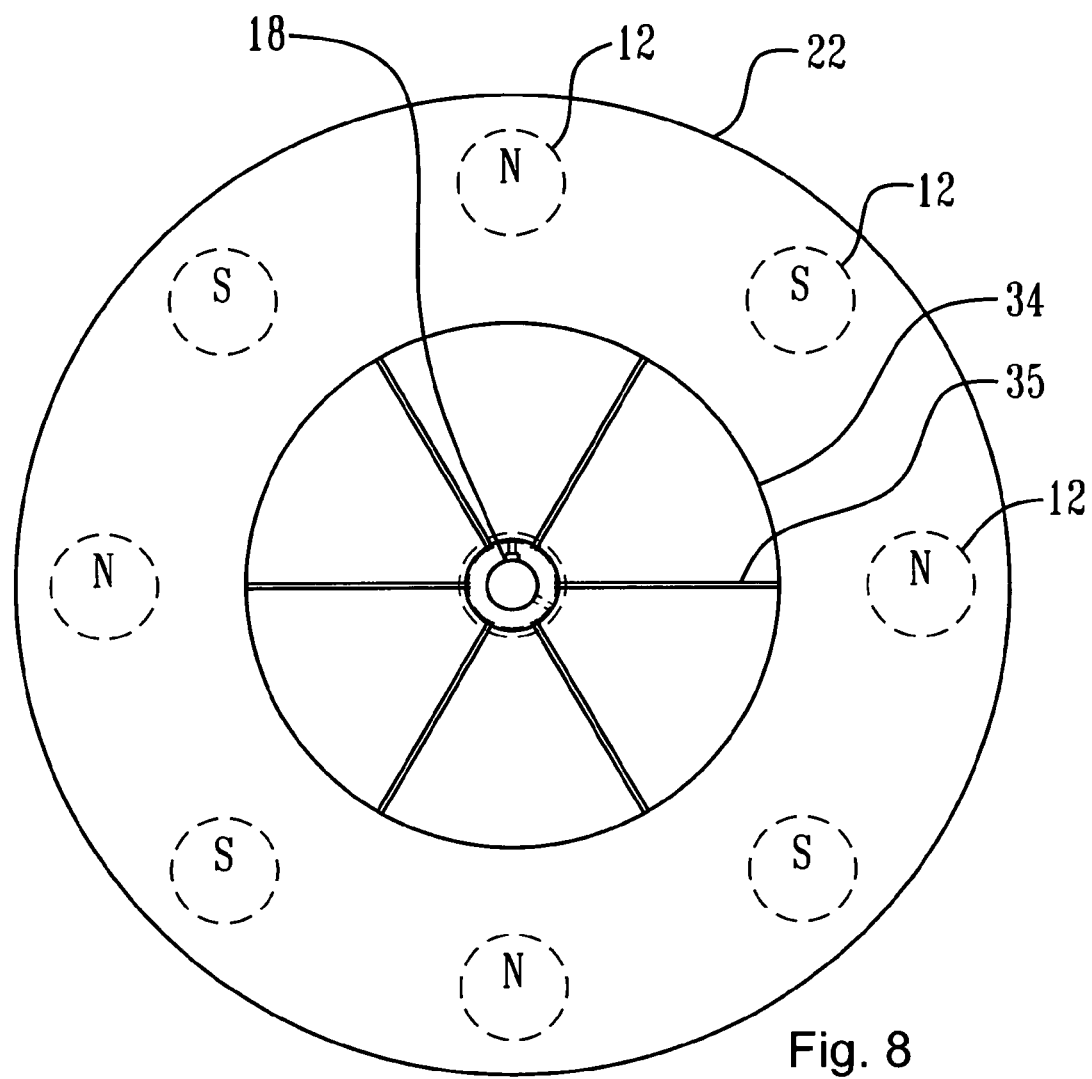
FIG. 8 is a front view of the embodiment of FIG. 7.

FIGS. 7 and 8 are side and front views of an embodiment of the magnetic heater 2 further comprising a fluid driver 34 engaged with a fluid path 16 for driving fluid therethrough, in accordance with the present invention. The fluid driver 34 comprises a plurality of fins 35 or blades and a driver shaft 36. Examples of suitable fluid drivers 34 include, but are not limited to, finned rotors, squirrel cages, and fans. In the embodiment of FIG. 7, the driver shaft 36 extends through an aperture 37 in the conductive member 14 and is coupled to the frame 22 on which the magnets 12 are arranged. The driving action is provided by rotation of the frame 22, which turns the fluid driver 34 in a predetermined direction. Thus, the speed of operation of the fluid driver 34 therein depends on the speed of motion of the frame 22, and likewise the rate of fluid flow within the fluid path 16. In other embodiments, the driver shaft 36 is coupled to, among other things, the shaft 18 or an external energy source.

In an embodiment wherein the conductive member 14 rather than the frame 22 moves to produce the cyclically varying magnetic field, the fluid driver 34 is driven by the rotation of the conductive member 14.

It is appreciated that the temperature to which fluid passing through the fluid path 16 is heated depends on the rate of heat generation in the conductive member 14, that is, on the amount of heat available to warm the fluid. Also, the temperature of the fluid depends on the rate at which the fluid moves through the fluid path 16, that is, on how much fluid is available to absorb the heat that is generated. Further, the temperature of the fluid depends on the efficiency of the conductive member 14 is releasing its heat to the fluid.

Also because the parameters, including rate of heat generation, rate of fluid flow, and fluid temperature, are independent of one another as described in some embodiments herein, a magnetic heater 2 in accordance with embodiments of the present invention is used to produce a specific temperature of fluid in combination with a specific quantity of fluid flow. Any two of the three parameters can be controlled independently of one another.

The energy source used to drive the shaft 18 can comprise any suitable means.

In embodiments in accordance with the present invention, the shaft 18 is coupled with a power take-off found on some motor vehicles, such as, but not limited to, many tractors, other agricultural vehicles, and heavy work vehicles. In such vehicles, some or all of the mechanical driving force generated by the engine is transferred to the power take-off to impart rotation, such as to the shaft 18. Conventional power take-offs include a rotatable coupling or other movable component, which is engaged with a linkage to impart rotation to the shaft 18.

In other embodiments, the shaft 18 comprises a hydraulic linkage. Certain vehicles include hydraulic systems, such as, but not limited to, for actuating a snow plow or shovel blade, for tipping a truck bed, or for operating a fork lift. The hydraulic system is adapted to couple with a piece of supplemental equipment, such as a hydraulic motor, with suitable linkage adapted to couple with the shaft 18, to provide power thereto. Hydraulic systems and hydraulic linkages are known in the art, and are not described in detail herein.

Various embodiments are anticipated so as to control the rate of heat output of the magnetic heater 2.

FIGS. 9A and 9B are side cross-sectional views of the magnetic heater 2 of FIG. 1, further comprising a spacing actuator 26 for varying the conductor/magnet spacing X1, in accordance with an embodiment of the present invention. The spacing actuator 26 varies the conductor/magnet spacing X1 between the conductive member first side 15 and the first magnet surface 13 along the x-axis.

The strength of the magnetic field exerted on a given portion of the conductive member 14 depends in part on the conductor/magnet spacing X1 between the magnets 12 and the conductive member 14. A change in the conductor/magnet spacing X1 changes the magnetic field strength to which the conductive member 14 is exposed, and thus changes the range of variation of the magnetic field over a cycle (the cyclical variation of the magnetic field), which changes the rate at which heat is generated in the conductive member 14. For permanent magnets, the cyclical variation of the magnetic field is accomplished while the absolute magnitude of the magnetic field strength remains substantially constant.

Reducing the conductor/magnet spacing X1 increases the magnetic field strength on the conductive member 14 and increases the magnetic induction, thus increasing the heating of the conductive member 14. Increasing the conductor/magnet spacing X1 reduces the magnetic field strength on the conductive member 14 and reduces the magnetic induction, thus reducing the heating of the conductive member 14.

In embodiments wherein it is desirable to enable a relatively high maximum rate of heat generation, it is desirable that a minimum value of the conductor/magnet spacing X1 between the conductive member 14 and the magnets 12 be as small as is practical. Similarly, in embodiments wherein it is desirable to enable a high range of variability in the rate of heat generation, it is desirable that the range of possible values for the conductor/magnet spacing X1 between the conductive member 14 and the magnets 12 is relatively large.

The conductor/magnet spacing X1 is a parameter that is independent of the rate of motion of the magnets 12 with respect to the conductive member 14, and thus independent of the rate of cyclical variation of the magnetic field. Thus, the rate of heat generation of the magnetic heater 2 is adjustable by varying the conductor/magnet spacing X1 without changing the period of cyclical variation of the magnet magnetic field.

Likewise, the conductor/magnet spacing X1 is independent of the absolute magnetic field strength of the magnets 12. Thus, the rate of heat generation of the magnetic heater 2 is adjustable by varying the conductor/magnet spacing X1 without changing the absolute magnetic field strength of the magnets 12. What is changing with varying the conductor/magnet spacing X1, among other things, is the magnitude of the magnetic field that the conductive member 14 is exposed to. The rate of heat generation of the magnetic heater 2 is adjustable while it is generating heat by adjusting the conductor/magnet spacing X1.

The spacing actuator 26 is engaged with either the magnet assembly 20 or the conductive member 14 so as to vary the conductor/magnet spacing X1 therebetween. In other embodiments, the magnetic heater 2 comprises separate spacing actuators 26 engaged with the magnet assembly 20 and the conductive member 14. Such arrangements facilitate adjustment of the conductor/magnet spacing X1, and consequently facilitates adjustment of the rate of heat generation. In an embodiment in accordance with the present invention, the spacing actuator 26 is used to facilitate adjustment of the conductor/magnet spacing X1 while the magnetic heater 2 is generating heat.

A variety of actuators are suitable for use as the spacing actuator 26. In one embodiment, as schematically illustrated in FIGS. 9A and 9B, the spacing actuator 26 is a simple linear actuator, engaged with the conductive member 14 to move it toward or away from the magnet assembly 20, thereby adjusting the conductor/magnet spacing from X1 to X2.

In an embodiment in accordance with the present invention, the spacing actuator 26 is a manual actuator, such as, but not limited to, a threaded screw controlled by a hand-turned knob. In other embodiments, the spacing actuator 26 is a powered actuator, such as, but not limited to, an electrically or hydraulically driven mechanism.

Referring again to FIG. 7, the magnetic heater 2 further comprises a controller 38. The controller 38 is in communication with the spacing actuator 26, so as to control the conductor/magnet spacing X1. The controller 38 also is in communication with the shaft 18, so as to control the speed of motion of the magnet assembly 20, and therefore, the magnets 12, which derive their motion from the shaft 18, wherein the output of the motive device driving the shaft 18 is variable and controllable.

The fluid driver 34 is engaged with the magnet assembly 20 so that the speed of operation of the fluid driver 34, and consequently the rate of fluid flow along the fluid path 16, also is determined by the speed of motion of the magnet assembly 20.

The controller 38 in FIG. 7 thus controls the rate of heat generation by controlling the conductor/magnet spacing X1, and also controls the rate of fluid flow by controlling the rate at which the fluid driver 34 operates. By controlling these two parameters independently, the temperature of the fluid also can be controlled as described previously.

A variety of devices are suitable for use as a controller 38, including, but not limited to, integrated circuits. Controllers are known in the art, and are not described further herein.

Although the embodiment in FIG. 7 shows the controller 38 in communication with various sensors 40, 42, it is emphasized that this is exemplary only. In other embodiments, the controller 38 controls the operation of the magnetic heater 2 without sensors or data therefrom. In embodiments in accordance with the present invention, the controller 38 comprises stored data and/or a pre-calculated algorithm, based on, among other things, the design of the magnetic heater 2 and the performance of similar magnetic heaters 2. The controller 38 controls the magnetic heater 2 to produce the desired levels of heat generation, fluid temperature, and/or rate of fluid flow, without the need for active sensors to monitor the parameters of the magnetic heater 2 itself.

The embodiment in FIG. 7 includes a fluid temperature sensor 40, for sensing the temperature of fluid moving along the fluid path 16. It also includes a fluid flow rate sensor 42, for sensing the rate of fluid flow through the fluid path 16. It further includes a drive sensor 44, for sensing the rate at which the magnet assembly 20 is driven by the shaft 18. The controller 38 is in communication with each of the sensors 40, 42, and 44.

Based on data from the sensors 40, 42, and 44, the controller 38 adjusts the speed of the magnet assembly 20, the speed of the fluid driver 34, and/or the conductor/magnet spacing X1, so as to control heat generation, fluid temperature, and/or fluid flow.

It is emphasized that the arrangement of the sensors 40, 42, and 44 as shown is exemplary only. It is not necessary for a particular embodiment to include sensors at all, or to include each of the sensors 40, 42, and 44 shown in FIG. 7. In other embodiments, other sensors are included in the magnetic heater 2 in addition to or in place of those shown.

In an embodiment, the magnetic heater 2 comprises an additional sensor adapted to sense the conductor/magnet spacing X1 between the magnets 12 and the conductive member 14.

A variety of sensors are suitable for use in a magnetic heater 2 according to embodiments of the present invention, depending upon the particulars of the specific embodiment of the magnetic heater 2 and the type of information that is to be sensed. Sensors are known in the art, and are not described further herein.

Figure 10:
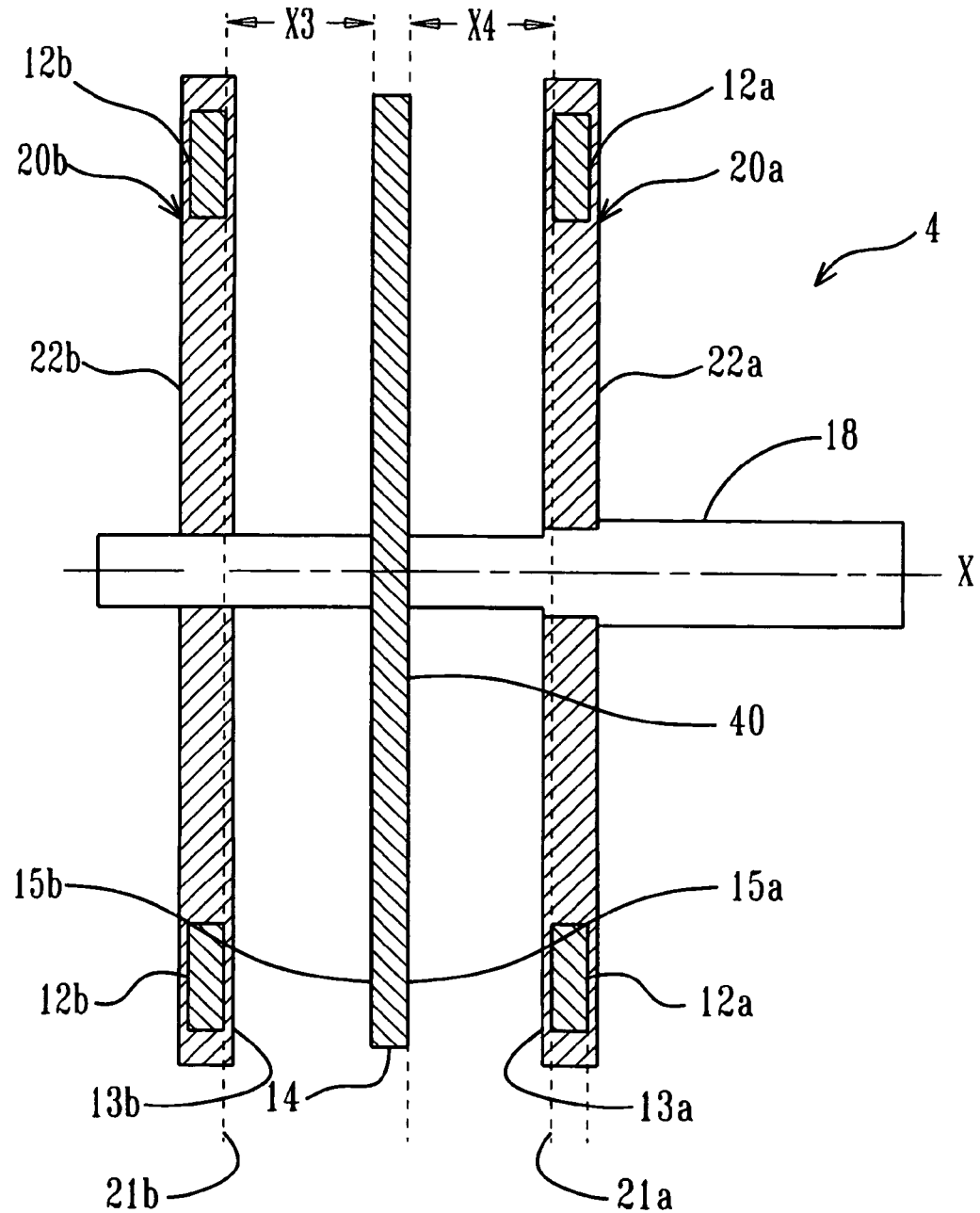
FIG. 10 is a side view of a radially moving magnet relative to a conductive member, in accordance with an embodiment of the present invention.

FIG. 10 is a side cross-sectional view of a magnetic heater 4 in accordance with an embodiment of the present invention. A conductive member 14 comprises a conductive member first side 15a and a conductive member second side 15b. A first magnet assembly 20a comprising a first frame 22a and a plurality of first magnets 12a thereon is disposed a first spacing X3 away from the conductive member first side 15a. Similarly, a second magnet assembly 20b comprising a second frame 22b and a plurality of second magnets 12b thereon is disposed a second spacing X4 away from the conductive member second side 15b of the conductive member 14.

The first and second magnet assemblies 20a, 20b are disposed adjacent the conductive member first and second sides 15a, 15b, respectively, such that the magnets 12a and 12b, respectively, are aligned with one another to form opposing pairs on each side 15a, 15b of the conductive member 14. In an embodiment wherein the first and second magnet assemblies 20a, 20b are movable, they are movable together and/or independently so as to maintain in opposing magnets pairs.

Figure 11:
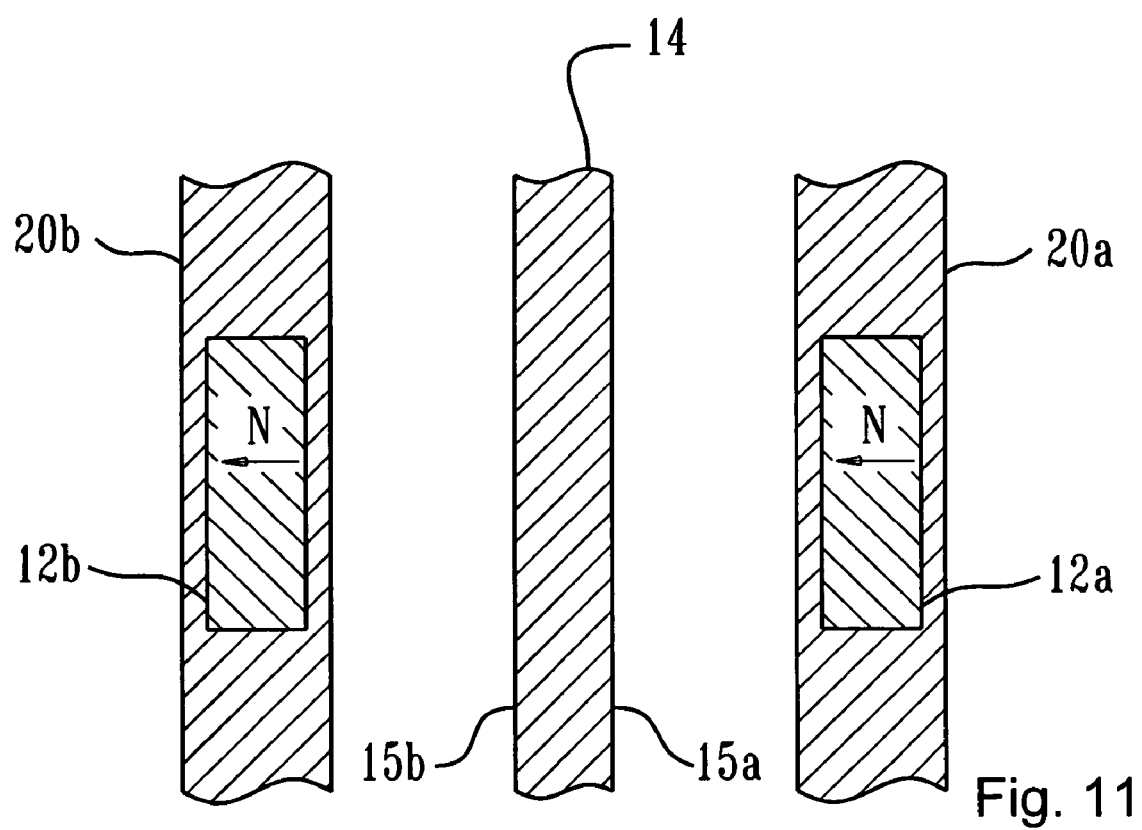
FIG. 11 is a partial view of the embodiment of FIG. 10, wherein different polarities of opposing magnets face the conductive member, in accordance with an embodiment of the present invention.

FIG. 11 is a cross-sectional partial view of the embodiment of FIG. 10, wherein different polarities of opposing magnets 12a, 12b face the conductive member 14, to present a predetermined gradient in the magnetic field. In another embodiment (not shown), the same polarity of opposing magnets 12a, 12b face the conductive member 14, to present a predetermined gradient in the magnetic field that is produced.

Figure 12:
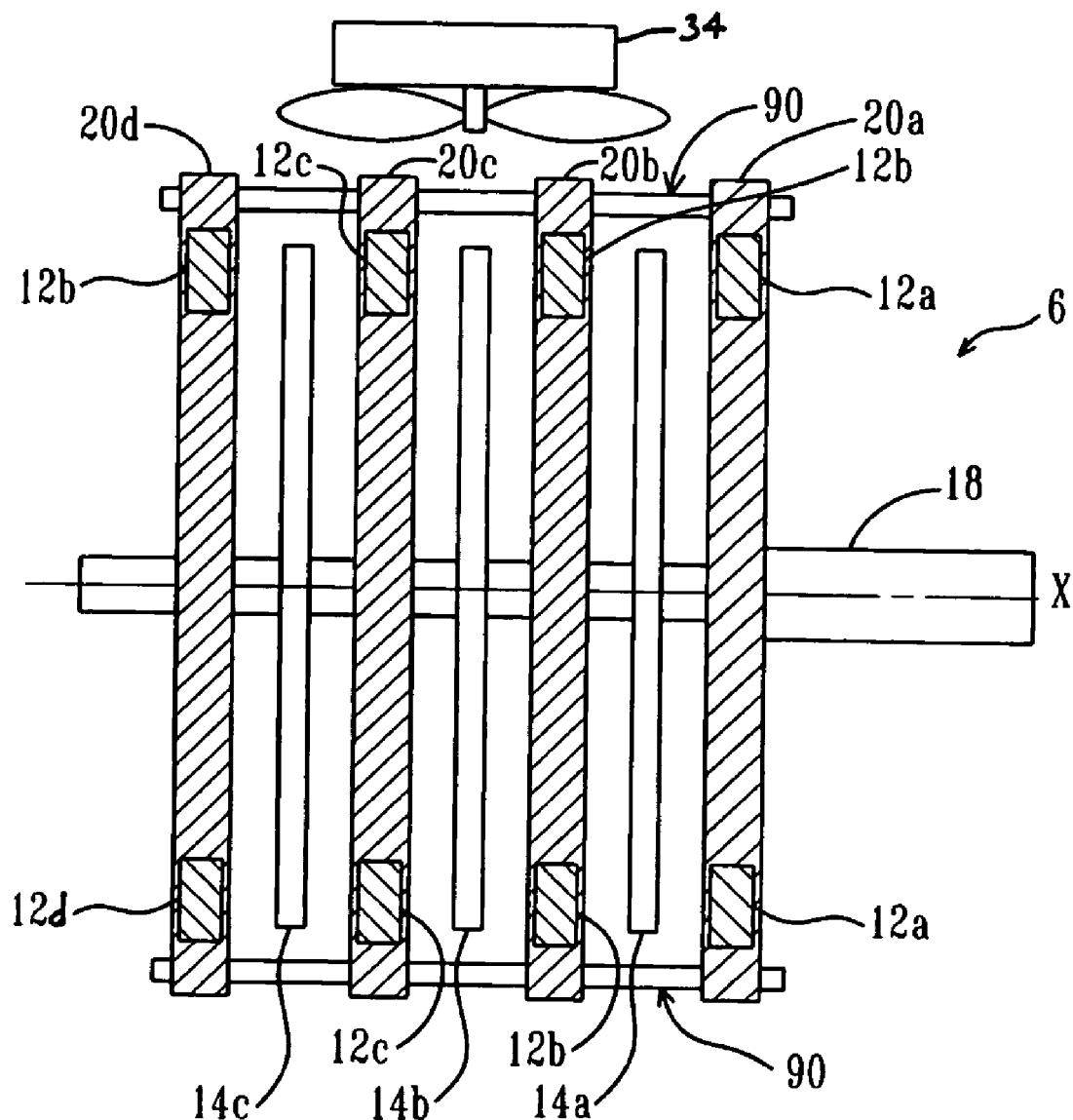
FIG. 12 is a multi-stage magnetic heater, in accordance with an embodiment of the present invention.

FIG. 12 is a side cross-sectional view of an embodiment of a multi-stage magnetic heater 6, in accordance with the present invention. As with the embodiment shown in FIG. 1, the embodiment of FIG. 10 may be conveniently expanded by the use of additional conductive members 14 and magnet assemblies 20. The embodiment of FIG. 12 comprises an arrangement with three conductive members 14a-c and four magnet assemblies 20a-d. It is noted that the number of conductive members 14 and magnet assemblies 20 is exemplary only, and that other numbers and arrangements may be suitable for a particular purpose. A fluid driver 34 is shown adjacent the conductive members 14 and magnet assemblies 20.

The multi-stage magnetic heater 6 further comprises support bracing 90 coupling the plurality of magnet assemblies 20a-d in relative axial alignment. It is appreciated that the operation of the magnetic heater 6 is effective whether the magnet assemblies 14a-d or the conductive members 14a-c are driven to rotation by the shaft 18.

Figure 13A:
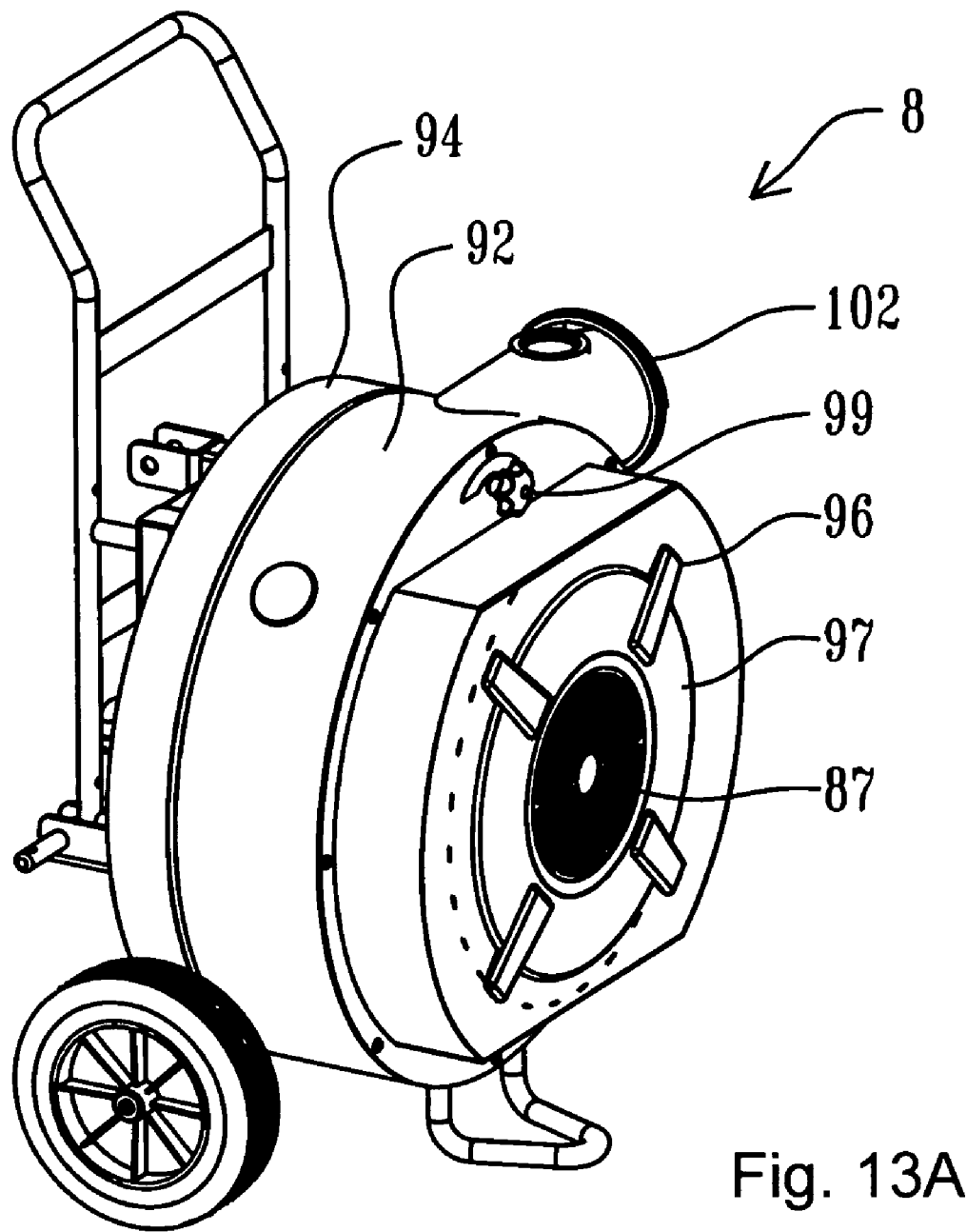
FIG. 13A is a perspective view of a magnetic heater apparatus, in accordance with an embodiment of the present invention.
Figure 13B:
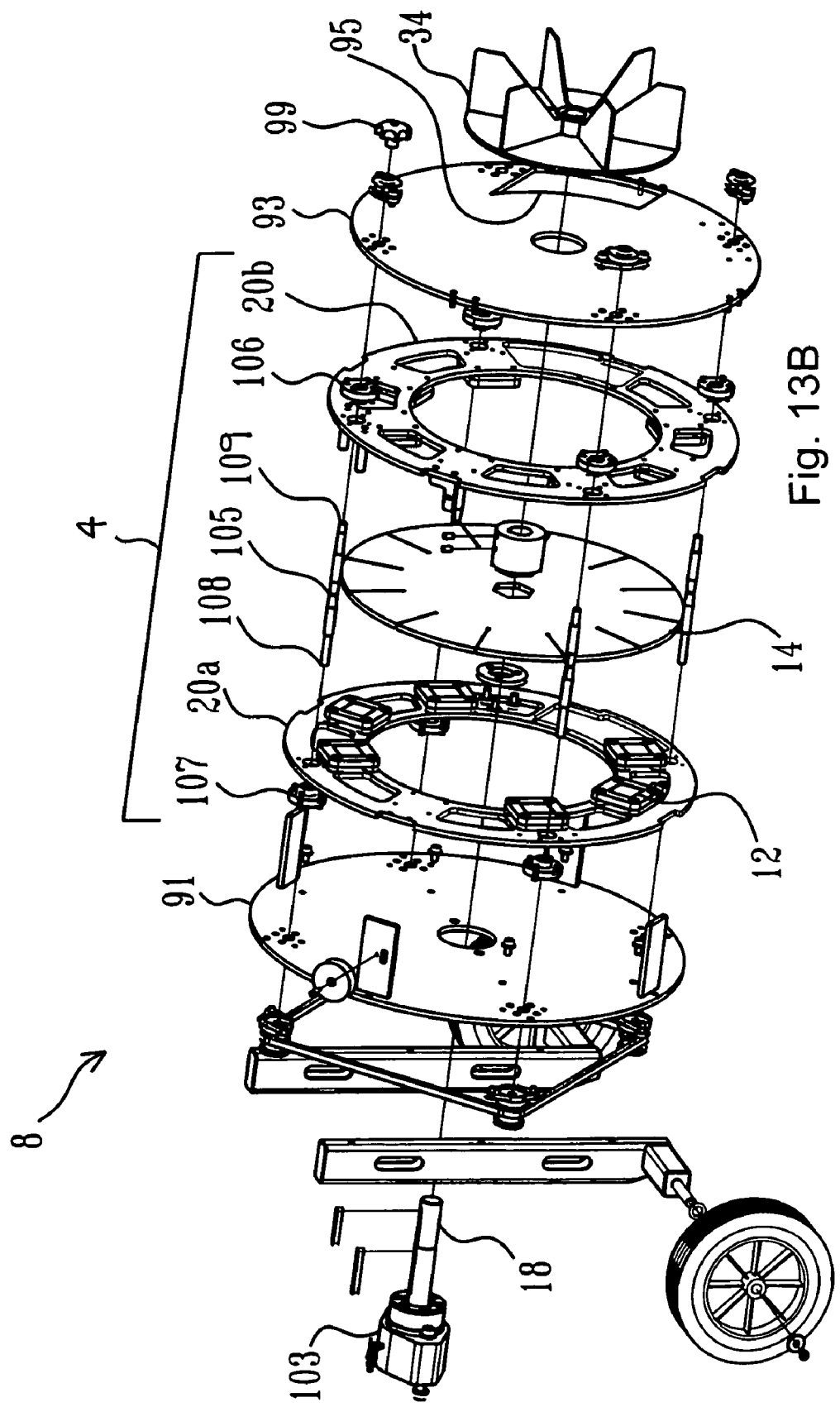
FIG. 13B is an exploded view of the magnetic heater apparatus of FIG. 13A.

FIGS. 13A and 13B are assembled and exploded views, respectively, of a magnetic heater apparatus 8 in accordance with an embodiment of the present invention. The magnetic heater apparatus 8 comprises a rear housing 94, a first end plate 91, a heater housing 92, a magnetic heater 6, a second end plate 93, a blower housing 96, and an air intake screen 97.

The magnetic heater 4, in accordance with the embodiment of FIG. 10, comprises a shaft 18, a first magnet assembly 20a, a conductive member 14, a second magnet assembly 20b and a fluid driver 34. The first and second magnet assemblies 20a, 20b comprise a plurality of magnets 12. The conductive member 14 is disposed between and coaxial with the first and second magnet assemblies 20a, 20b. The conductive member 14 is coupled with the shaft 18 and adapted to rotate with respect to the first and second magnet assemblies 20a, 20b. The shaft 18 is adapted to couple with an energy source 103.

The rear housing 94 is coupled adjacent the first end plate 91, both comprising apertures to allow the shaft 18 to pass there through. The first end plate is coupled adjacent the heater housing 92 defining a volume adapted to contain the first and second magnet assemblies 20a, 20b and conductive member 14. The second end plate 93 is coupled adjacent the heater housing 92 defining a side of the volume. The heater housing 92 comprises a fluid outlet 102. The second end plate 93 comprises a second end plate aperture 95 defining a portion of a fluid path. The fluid driver 34 is coupled to the shaft 18 and located adjacent the second end panel 93 on the opposite side from the second magnet assembly 20b. The blower housing 96 is coupled adjacent the second end panel 93 enclosing the fluid driver 34 there between. The blower housing 96 defines a fluid inlet aperture 87 defining a portion of the fluid path. The air intake screen 97 is coupled to the blower housing 96 covering the fluid inlet aperture 87.

A fluid path is defined by the fluid inlet aperture 87, the fluid driver 34, the second end plate aperture 95, the heater housing 92 and the fluid outlet 102. Fluid is drawn into the fluid inlet aperture 87 by the rotation of the fluid driver 34. The fluid driver 34 directs the fluid through the second end plate aperture 95 and circulates the fluid past the conductive member 14 in the heater housing 92. The heater housing 92 directs the fluid to the fluid outlet 102.

The magnetic heater apparatus 8 further comprises a spacing adjustment assembly 103 comprising a knob 99, a threaded spacer 105 having a first spacer end 108 and a second spacer end 109, a first retention coupler 107 and a second retention coupler 106. The first retention coupler 107 is positioned adjacent the first magnet assembly 20a and the second retention coupler 109 is positioned adjacent the second magnet assembly 20b. The threaded spacer 105 is disposed between the first and second magnet assemblies 20a, 20b, the first spacer end 108 coupled with the first retention coupler 107. The second spacer end 109 is passed through the second retention coupler 106 and coupled to the knob 99. Turning the knob 99 in a first direction reduces the spacing between the first and second magnet assemblies 20a, 20b. Turning the knob 99 in the opposite direction increases the spacing between the first and second magnet assemblies 20a, 20b.

Figure 14A:
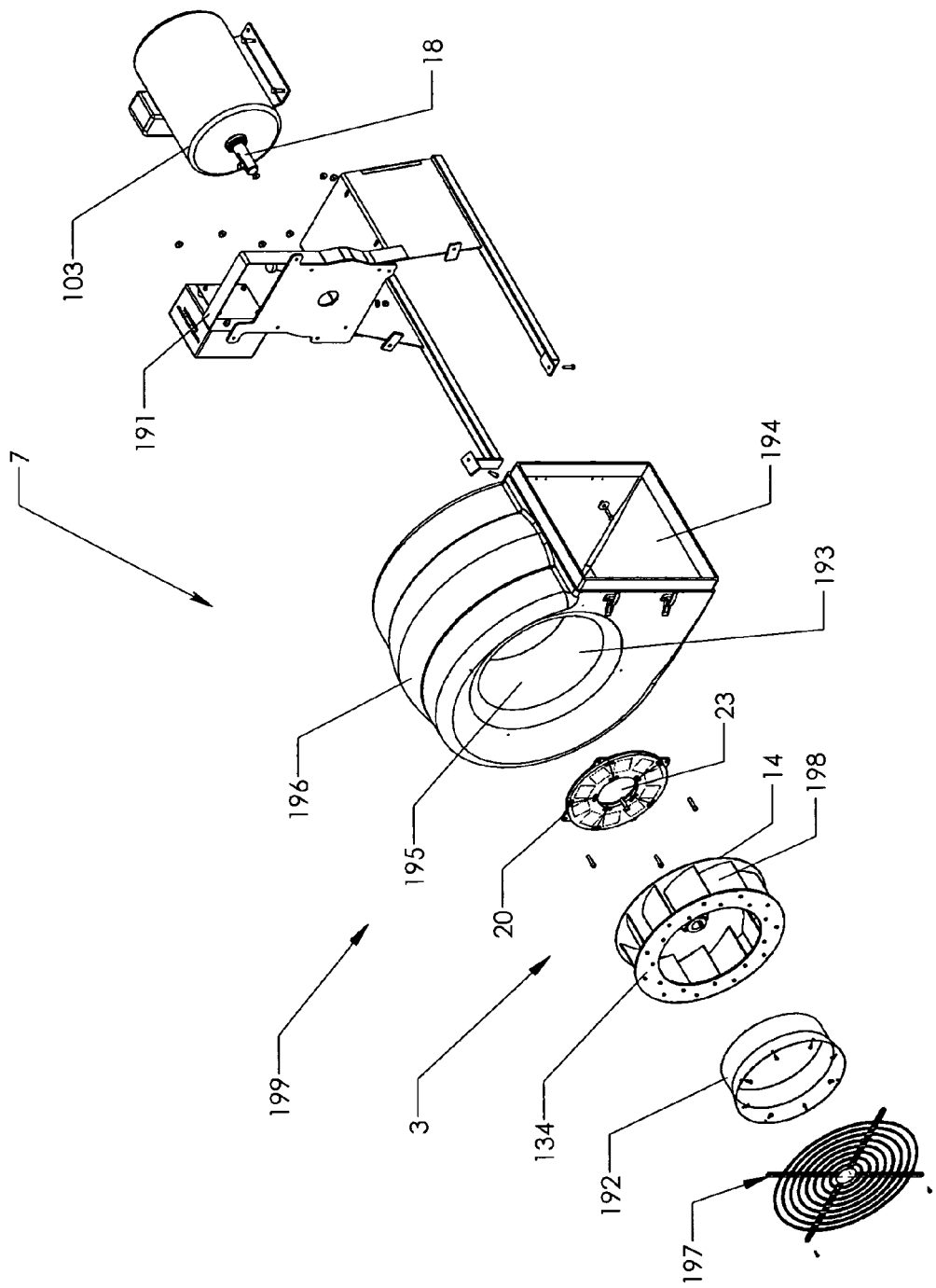
FIG. 14A is a perspective exploded view of a magnetic heater apparatus, in accordance with another embodiment of the present invention.
Figure 14B:
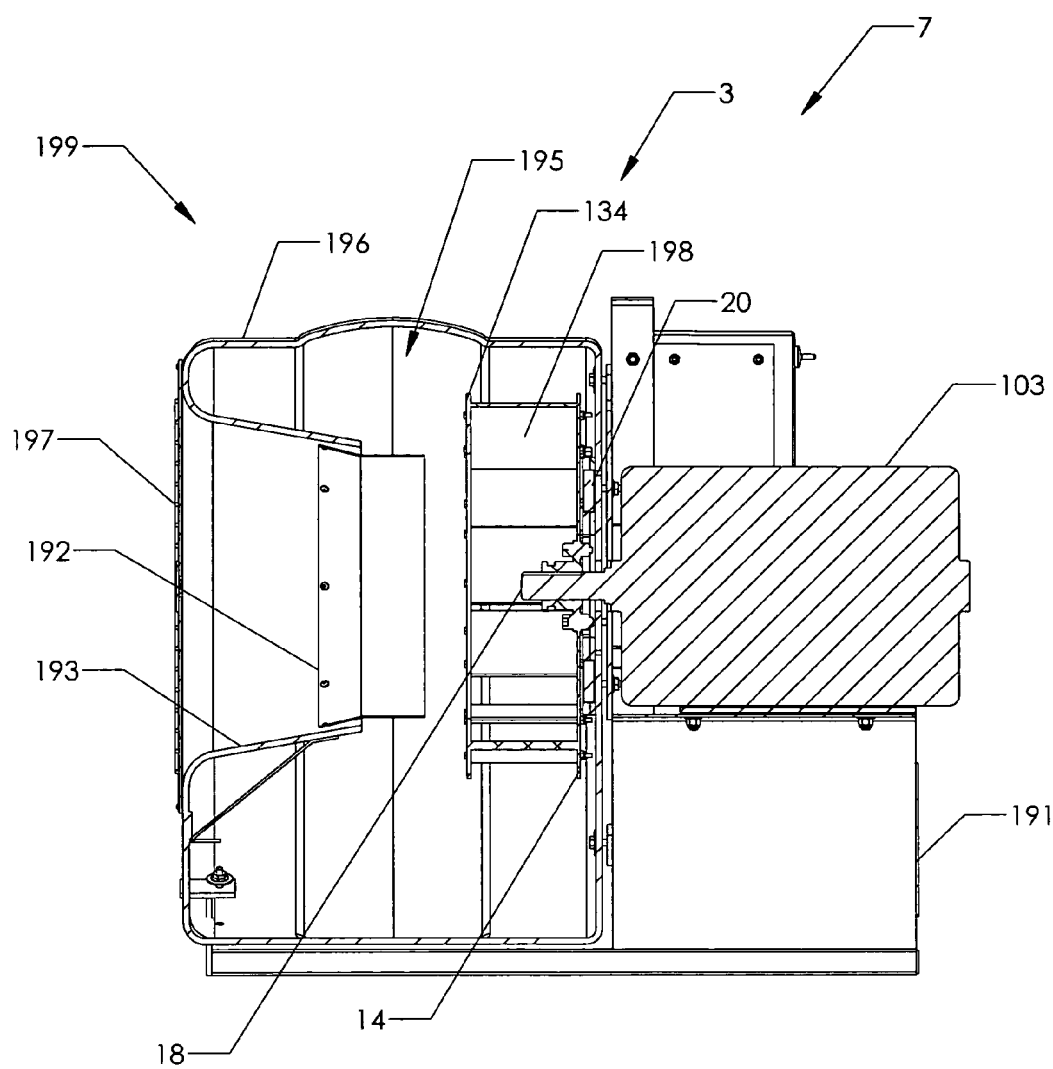
FIG. 14B is a side cross-sectional view of the magnetic heater apparatus of FIG. 14A.

FIGS. 14A and 14B are exploded perspective and cross-sectional side views, respectively, of a magnetic heater apparatus 7 in accordance with an embodiment of the present invention. The magnetic heater apparatus 7 comprises a blower 199 and a magnetic heater 3. The blower 199 comprises a motor mount 191, a motor 103, a blower housing 196, blower fan 134, a blower housing sleeve 192, and an air intake screen 197. The magnetic heater 3 comprises a magnet assembly 20 and a conductive member 14 that is an element of the blower fan 134 as described below.

Those in the air-moving arts will recognize that the blower 199 is substantially of the known squirrel-cage blower configuration. The blower housing 196 defines an annular volume 195 in fluid communication with an axial inlet 193 and a tangential outlet 194.

The blower fan 134 comprises a plurality of fan blades 198 coupled to the conductive member 14. The conductive member 14 is in the form of a disk-shaped plate of substantially the same configuration as the embodiment of FIG. 3. The magnet assembly 20 is also of substantially the same configuration as the embodiment of FIG. 3. The magnet assembly 20 comprises an axial shaft annulus 23. The magnet assembly 20 is coaxially located within the annular volume 195. The blower fan 134 is coaxially located within the annular volume 195 such that the conductive member 14 of the blower fan 134 is located co-axially and adjacent magnet assembly 20. The blower housing sleeve 192 is coupled to the blower housing 196 about the axial inlet 193 located co-axially with and adjacent to the blower fan 134 and adapted to guide air flow from the axial inlet 193 to the blower fan 134. The air intake screen 197 is coupled to the blower housing 196 so as to cover the axial inlet 193.

It is anticipated that in other embodiments in accordance with the present invention, the blower housing sleeve 192 is an integral part of the blower housing 196 in consideration of engineering preference.

The motor mount 191 is coupled to the blower housing 196, and the motor 103 is coupled to the motor mount 191 such that a shaft 18 of the motor 103 is located coaxially with the magnet assembly 20 and the blower fan 134 extending into the annular volume 195. The shaft 18 extends into the annular volume 195, passing through the shaft annulus 23 of the magnet assembly 20, and is coupled in operative engagement to the conductive member 14, so as to rotate the conductive member 14, and thus the blower fan 134, when in operation. The magnet assembly 20 is coupled to and fixed the blower housing 196. In operation, the conductive member 14 is rotated relative to the stationary magnet assembly 20, whereby the conductive member 14 is heated due to inductive heating from a time-varying magnetic flux induced by the magnet assembly 20.

It is anticipated that in other embodiments in accordance with the present invention, the motor 103 is mounted to the blower housing 196 in any suitable manner, in consideration of engineering preference.

In operation, air is drawn into the axial inlet 193, directed by the blower housing sleeve 192, by the blower fan 134. The air passes over the conductive member 14 wherein the heat generated by the magnetic heater 3 is transferred to the air. The heated air is subsequently exhausted out of the tangential outlet 194. In other embodiments in accordance with the present invention, the fan blades 198 are adapted to act as heat sinks for the transfer of heat from the conductive member 14 to the air.

FIG. 15 is a front view of a magnetic heater 9, in accordance with an embodiment of the present invention. FIG. 16 is a side cross-sectional view of the magnetic heater of FIG. 15 along cut line 16-16. The magnetic heater 9 comprises a plurality of conductor assemblies 50, 50a-b and a plurality of magnet assemblies 60, 60a-c in closely-spaced, opposing, alternating configuration, aligned along an axis about a shaft 18. Each of the plurality of magnet assemblies 60 are coupled to the shaft 18, such that the magnet assemblies 60 rotate relative to the conductor assemblies 50 when the shaft is rotated.

It is appreciated that in other embodiments, the magnetic heater 9 may comprise one or more conductor assemblies 50 and one or more magnet assemblies 60 suitable for a particular purpose. By way of example, but not limited thereto, a magnetic heater may have one conductor assembly 50 and one magnet assembly 60; one conductor assembly 50 and two magnet assemblies 60, one magnet assembly 60 on either side of the conductor assembly 50; one magnet assembly 60 and two conductor assemblies 50, one conductor assembly 50 on either side of the magnet assembly 60; and combinations of the above. One can understand that heat output is related to the number of conductor assemblies 50 and magnet assemblies 60 and that the magnetic heater provides a modular approach for providing heat output.

FIG. 17 is a partial cutaway detailed view of the side cross-sectional view of FIG. 16. The magnet assembly 60 comprises one or more magnets 12 and is adapted to dispose the one or more magnets 12 in close proximity to the conductor assembly 50.

Figure 18:
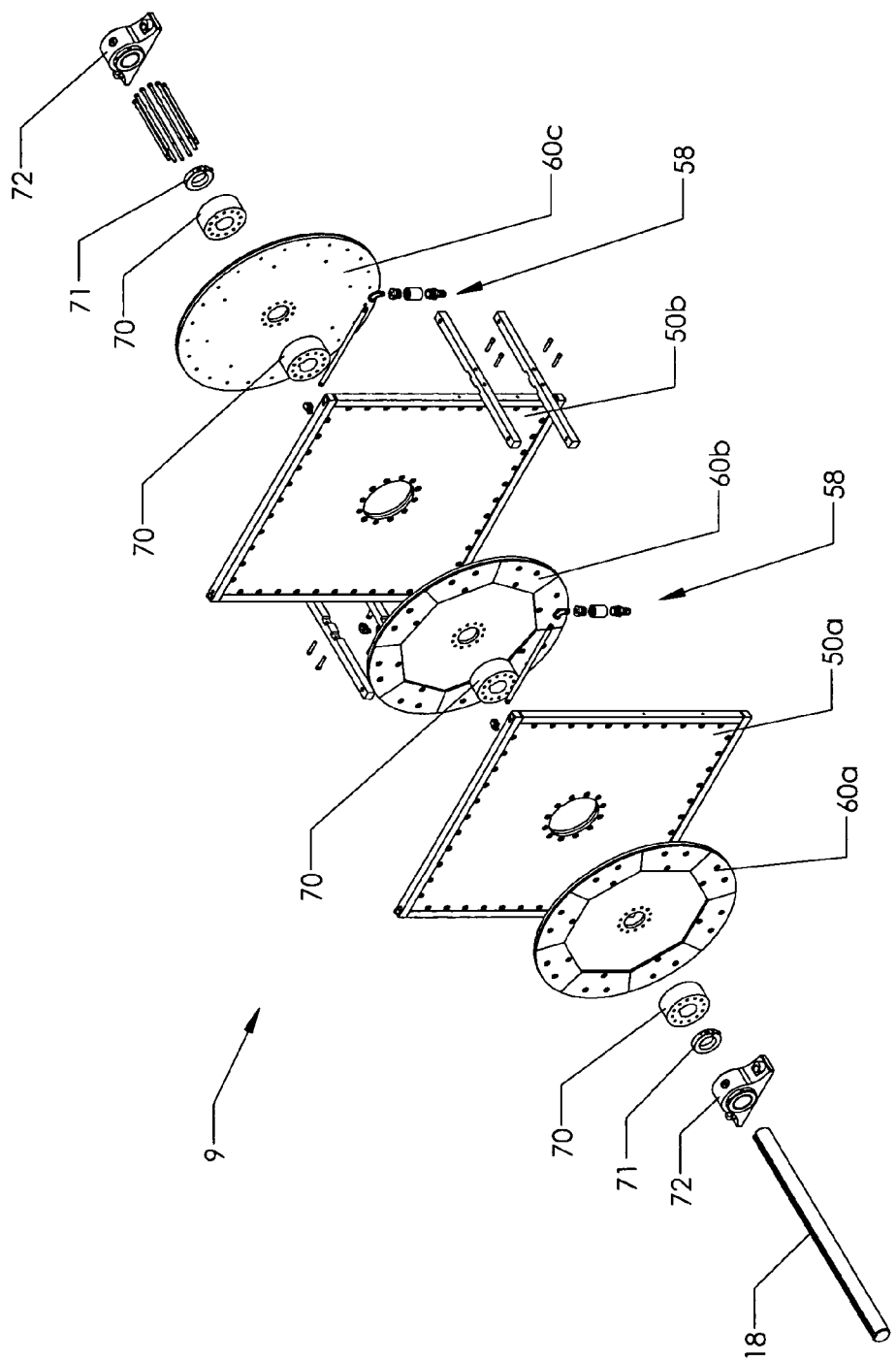
FIG. 18 is a partially exploded view of the magnetic heater of FIG. 15.

FIG. 18 is a partially exploded view of the magnetic heater 9 of FIGS. 15-17. The magnetic heater 9 comprises a first, second and third conductor assembly 50a-b in alternating arrangement with a first, second, third, and fourth magnet assembly 60a-c. The conductor assemblies 50a-b and magnet assemblies 60a-c are disposed upon a shaft 18, which itself is supported by a pair of pillow blocks 72. The conductor assemblies 50a-b and magnet assemblies 60a-c are spaced apart a predetermined distance and held together as an assembly by a plurality of bushings 70, collars 71, and the pillow blocks 72. The magnetic heater 9 is adapted such that the magnet assemblies 60a-c are coupled to the shaft 18 and rotate relative to the conductor assemblies 50a-b when the shaft 18 is rotated.

Figure 19:
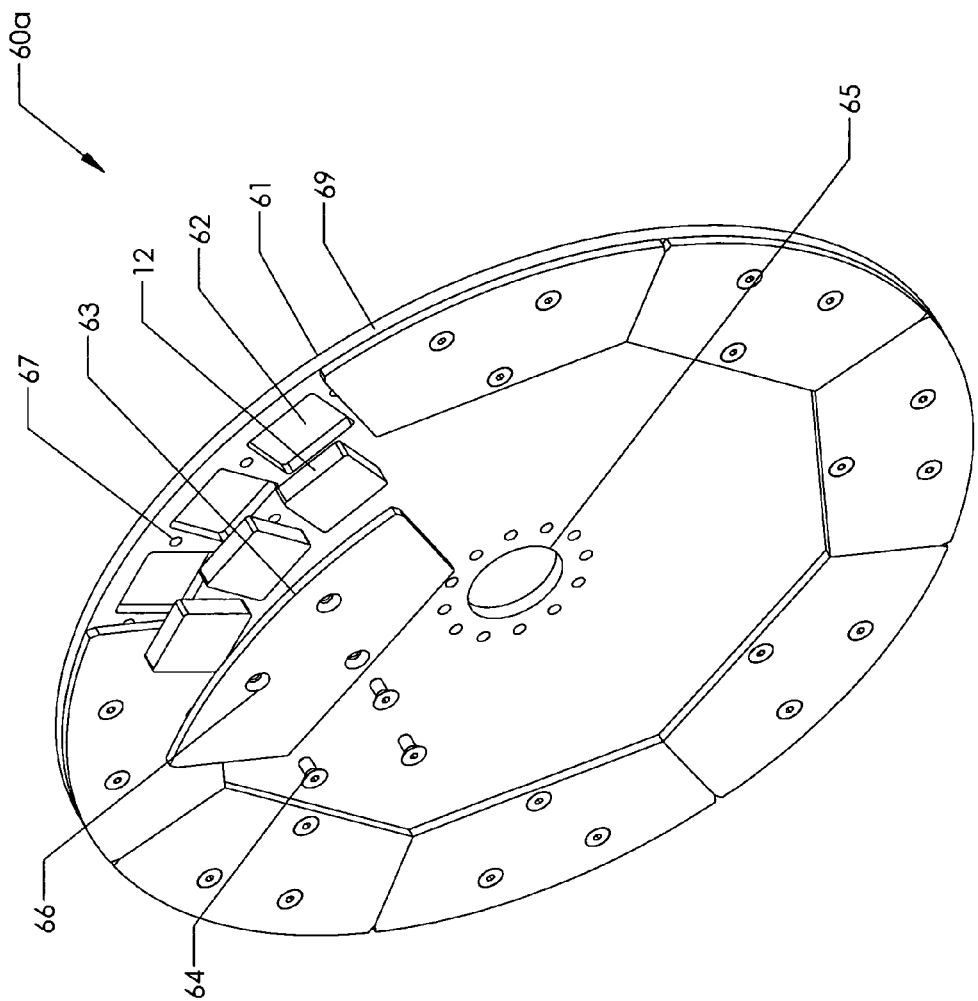
FIG. 19 is an exploded perspective view of a rotatable magnet assembly of the magnetic heater of FIG. 15.

FIG. 19 is an exploded perspective view of a magnet assembly 60 of the magnetic heater 9 of FIG. 15. The magnet assembly 60 comprises a magnet plate 61 in the form of a substantially circular disk. Disposed on a side of the magnet plate 61 and a predetermined distance adjacent the magnet plate peripheral edge 69 are a plurality of magnet pockets 62 adapted to at least partially receive at least one magnet 12 therein. The magnets 12 are retained within the magnet pockets 62 by a plurality of retainer plates 63. The retainer plates 63 comprise a plurality of fastener apertures 66 adapted to receive suitable fasteners 64 there through. The fastener apertures 66 are adapted to align with threaded bores 67 disposed in the magnet plate 61. The retainer plates 63 engage the magnets 12 and the magnet plate 61 to retain the magnets 12 within respective magnet pockets 62.

Referring again to FIG. 17, the retainer plates 63 comprise a plurality of retainer pockets 68 complementary with the magnet pockets 62 and adapted to receive at least one magnet 12 therein. In other embodiments, either the magnet pockets 62 or the retainer pockets 68 are adapted to receive the magnet 12 entirely therein, and either the retainer plate 63 or the magnet plate 61, respectively, comprise a substantially flat surface to contain the magnet 12 there in.

The magnet plate 61 further comprise a central shaft aperture 65 adapted to receive the shaft 18 there through.

It is appreciated that in other embodiments, the magnet assembly 60 may comprise one or more magnets 12 suitable for a particular purpose. The magnet 12 provides a time-varying magnetic flux on the conductor assembly 50 when there is relative movement of the magnet 12 with respect to the conductor assembly 50. Such magnetic flux may be provided by one or more magnets 12. Further, the size and shape of the magnet 12 can be chosen to provide a predetermined magnetic flux density suitable for a particular purpose. In yet other embodiments in accordance with the present invention, there is provided multiple rows of magnets 12 spaced apart in the radial direction from the shaft aperture 65.

Further, it is appreciated that in other embodiments in accordance with the present invention, the magnet assembly 60 may take other forms suitable for a particular purpose for providing the magnets 12 in close proximity to the conductor assembly 50. The magnets 12 can be coupled to the magnet plate by other fastening means, including, but not limited to, fasteners, adhesives, and coatings, with or without the retainer plate 61. In embodiments wherein the magnet assembly 60 is rotated, the means of retention of the magnets 12 to the magnet plate 61 must withstand the forces tending to decouple and throw the magnets 12 from the magnet plate 61.

Figure 20:
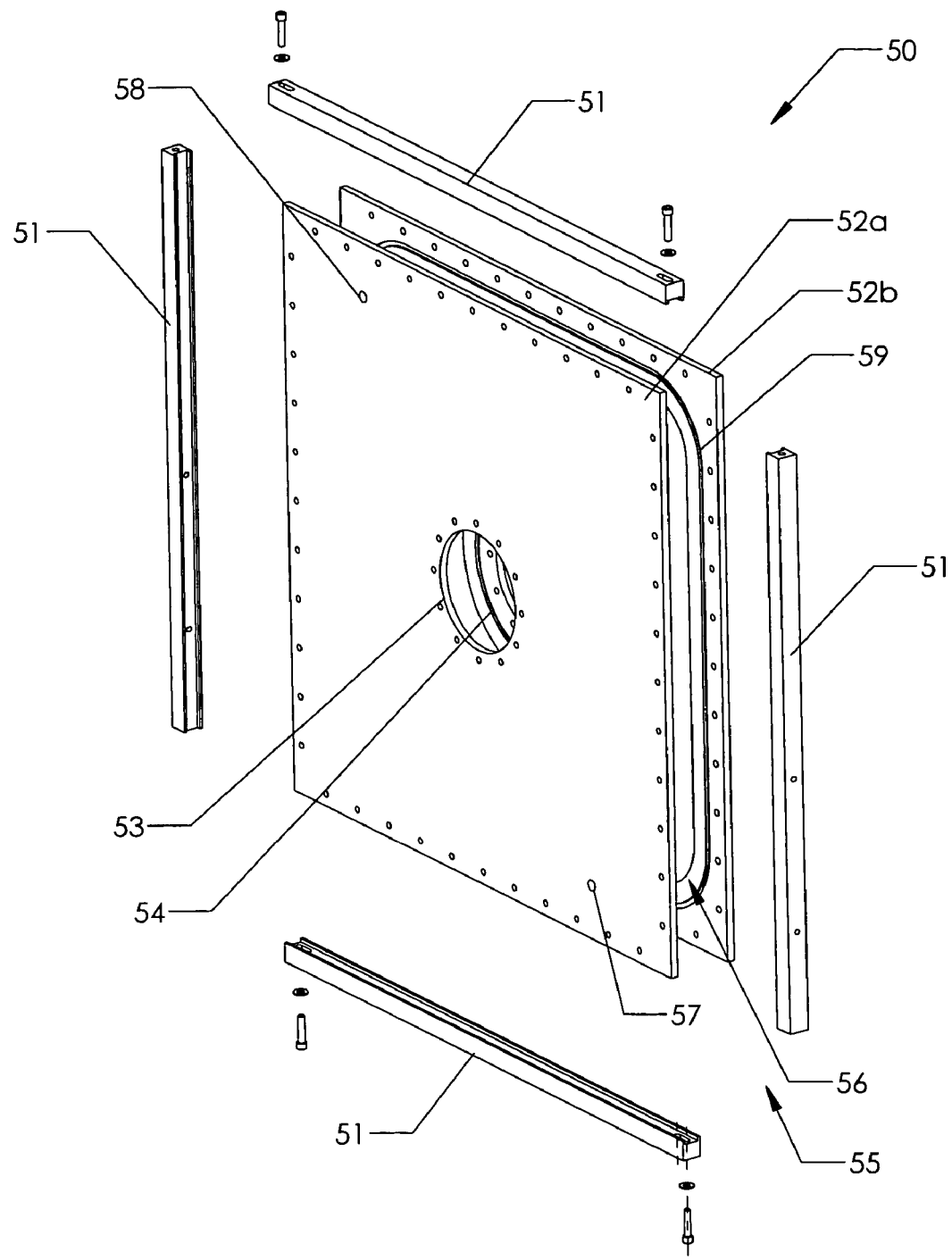
FIG. 20 is an exploded perspective view of a conductor assembly of the magnetic heater of FIG. 15.

FIG. 20 is an exploded perspective view of a conductor assembly 50 of the magnetic heater 9 of FIG. 15. The conductor assembly 50 comprises a pair of conductor plates 52a, 52b retained about a peripheral edge 55 in fluid-tight engagement by a frame 51. At least one of the pair of conductor plates 52a, 52b comprises an electrically conductive material suitable for the particular purpose, adapted to enable induced eddy-currents within the conductor plate 52a, 52b when exposed to a time-varying magnetic flux which causes the conductor plate 52a, 52b to heat up.

The frame 51 is adapted to retain the conductor plates 52a, 52b in a facing relationship a predetermined distance apart defining a fluid space 56 there between. A gasket 59 seals the peripheral edge 55 of the conductive plates 52a, 52b such that fluid is retained within the fluid space 56. It is appreciated that suitable means for fluid-tight sealing is provided, such as, but not limited to, welding, brazing, soldering, the frame 51, coatings, and resilient sealing elements, such as, but not limited to, an "O-ring" and gasket.

The conductor plates 52a, 52b each have a bushing aperture 53 adapted to receive the bushing 70 therein. A bushing aperture seal 54 about the bushing aperture 53 and adapted to engage the conductor plates 52a, 52b about the bushing aperture 53 is adapted to maintain fluid-tight engagement there between to retain fluid within the fluid space 56.

Referring again to FIGS. 15 and 18, the conductor assembly 50 further comprises a fluid inlet 57 and a fluid outlet 58, in communication with the fluid space 56. Referring to FIG. 20, the fluid inlet 57 and outlet 58 are an element of one or both of the conductor plates 52a, 52b. The conductor assembly 50 is adapted such that fluid may be passed between the fluid inlet 57, the fluid space 56, and the fluid outlet 58 sufficient to provide efficient heat transfer from the conductor plates 52a, 52b to the fluid as the conductor plates 52a, 52b are heated during operation.

Figure 21:
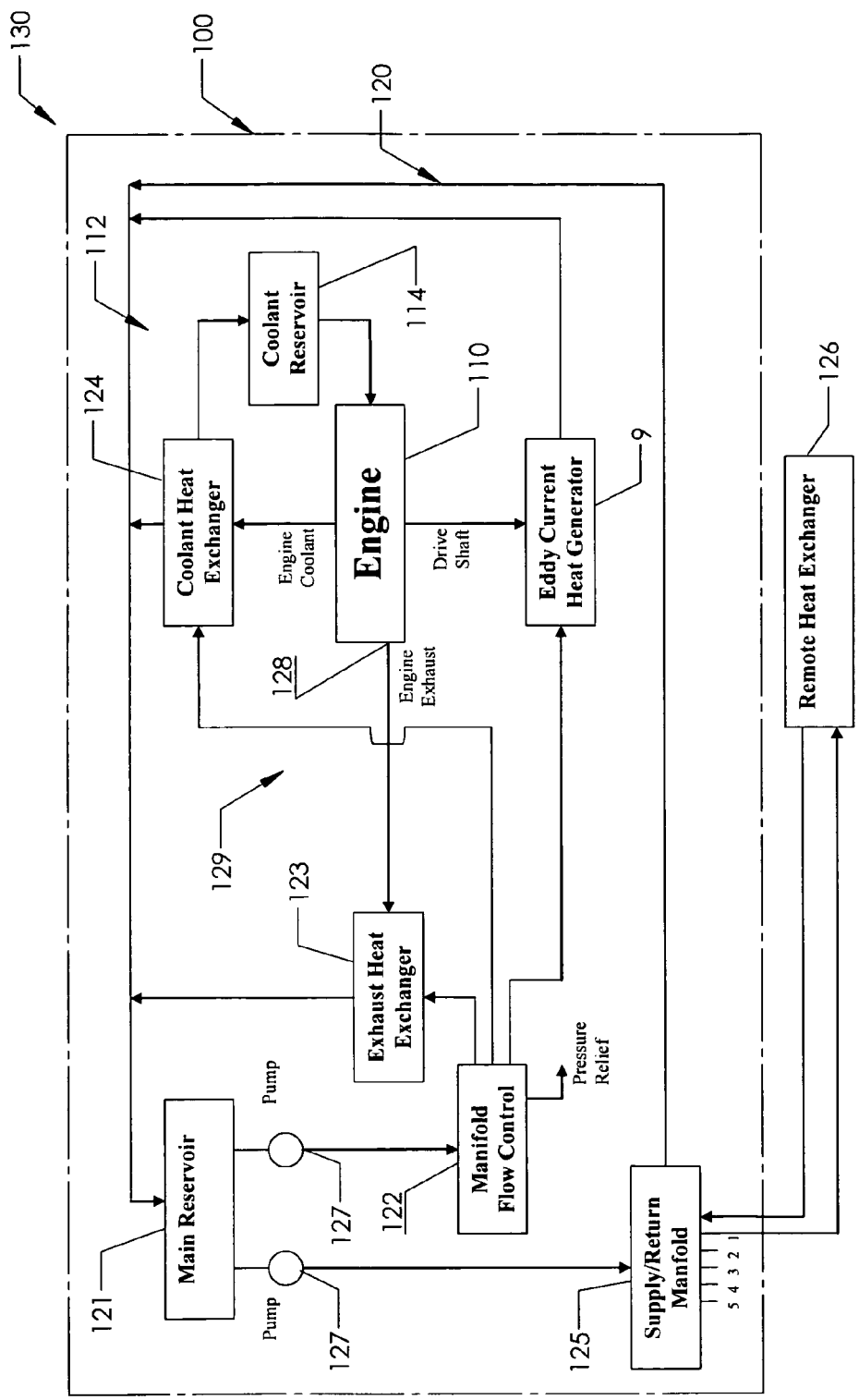
FIG. 21 is a schematic diagram of an engine-driven heat generation system, in accordance with an embodiment of the present invention.

FIG. 21 is a schematic diagram of an engine-driven heat generation system 100, in accordance with an embodiment of the present invention. The engine-driven heat generation system 100 provides heat to external applications via a working fluid supplied to a suitable external heat exchanger 126 as described below. The engine-driven heat generation system 100 comprises an internal combustion engine 110, a magnetic heater 9, such as, but not limited to, the embodiment of FIG. 18, and a fluid handling system 130. A drive coupling of the engine 110 drives or rotates the magnet assemblies 60 within the magnetic heater 9 which in turn heats the conductor plates 52a, 52b and the working fluid flowing within the conductor assemblies 50.

The fluid handling system 130 comprises a working fluid handling system 120, an engine cooling system 112, and an exhaust system 129. The working fluid handling system 120 comprises a fluid reservoir 121, a manifold flow control 122, an exhaust heat exchanger 123, a coolant heat exchanger 124, and one or more circulating pumps 127, all in fluid communication adapted to circulate the working fluid therein. The manifold flow control 122 is adapted to direct the working fluid to the magnetic heater 9, the exhaust heat exchanger 123, and the coolant heat exchanger 124.

The heat generated by the magnetic heater 9 is transferred to the working fluid passing within the magnetic heater 9. The working fluid is collected in the fluid reservoir 121 and either directed again through the manifold flow control 122 or directed to an external heat exchanger 126 by way of an external manifold 125, or a combination thereof. The external manifold 125 is adapted to provide one or more fluid take-offs to supply the heated working fluid and return cooled working fluid to/from one or more external heat exchangers 126.

The engine cooling system 112 comprises a coolant reservoir 114 for a coolant fluid in fluid communication with the engine 110 and the coolant heat exchanger 124. The coolant fluid circulates within the engine 110, wherein the heat from the structure of the engine 110 is transferred to the coolant fluid and subsequently transferred to the working fluid in the coolant heat exchanger 124. In this way, the heat from the engine 110 as well as the heat from the magnetic heater 9 is used to heat the working fluid.

The engine 110 produces hot exhaust gas as a product of combustion which is directed external to the engine 110 by an exhaust manifold 128. The exhaust system 129 comprises the exhaust heat exchanger 123 which is in fluid communication with the exhaust manifold 128 and is adapted to transfer the heat from the exhaust of the engine 110 to the working fluid. In this way, the heat from the exhaust as well as the heat from the magnetic heater 9 is used to heat the working fluid.

The engine-driven heat generation system 100, therefore, utilizes the heat of the structure and the heat from the exhaust of the engine 110 to augment the heat from the magnetic heater 9 to efficiently provide a heated working fluid for use in external applications.

Figure 22:
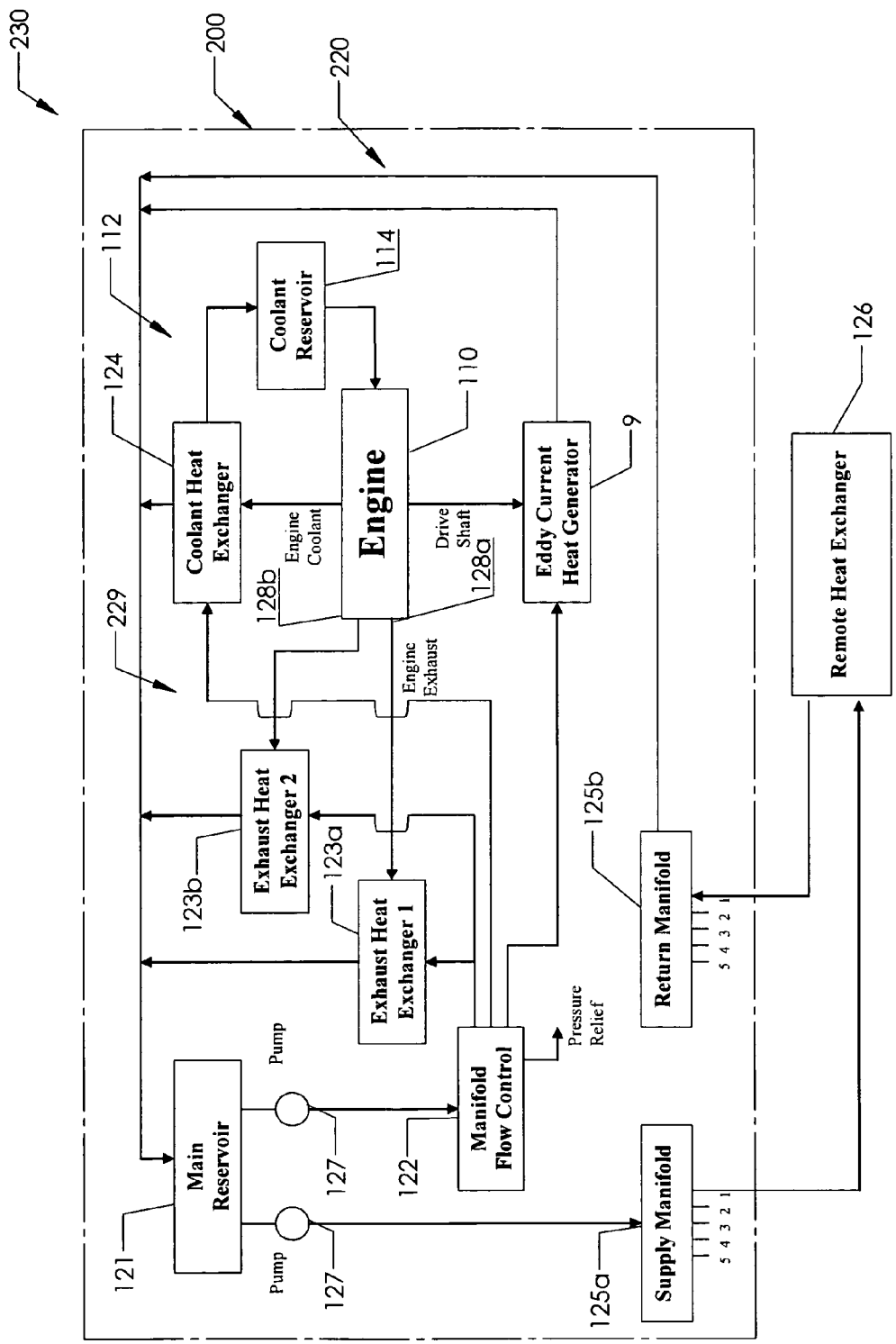
FIG. 22 is a schematic diagram of an engine-driven heat generation system, in accordance with an embodiment of the present invention.

It is appreciated that a variety of configurations of an engine-driven heat generation system may be utilized, depending on engineering design preferences and constraints. FIG. 22 is a schematic diagram of another engine-driven heat generation system 200, in accordance with another embodiment of the present invention. The engine-driven heat generation system 200 comprises an internal combustion engine 110, a magnetic heater 9, such as, but not limited to, the embodiment of FIG. 18, and a fluid handling system 230. The configuration and function is substantially similar to the embodiment of FIG. 21, but this embodiment comprises an engine 110 having two exhaust manifolds 128a, 128b, two exhaust heat exchangers 123a, 123b in fluid communication with respective exhaust manifolds 128a, 128b, and separate external manifolds, a supply manifold 125a and a return manifold 125b.

The applications for utilizing the heat generated by the engine-driven heat generation system 100,200 are vast. The working fluid is heated to a predetermined temperature suitable for a particular purpose. It is anticipated that most any application that utilizes the transfer of heat via a heat exchanger supplied by a heated working fluid would be suitable for use with the engine-driven heat generation system 100,200.

In an embodiment in accordance with the present invention, the heated working fluid is passed through a heat exchanger that is part of a forced-air ventilation system to provide heated air to a building. In another embodiment, the working fluid is passed through hoses that are laid out on the ground and covered with a covering so as to heat the ground, such as to thaw out frozen ground for excavation. In yet another application, the working fluid is passed through a heat exchanger of a hot water supply system that is submerged in a tank of water so as to heat the water for use. These are but a few of the vast number of applications suitable for use with the engine-driven heat generation system 100,200.

The engine-driven heat generation system 100,200 realizes significantly improved efficiencies over conventional magnetic heaters by the utilization of the heat captured from the engine exhaust and the heat captured from the engine cooling system that are added to the heat generated by the magnetic heater.

Figure 23:
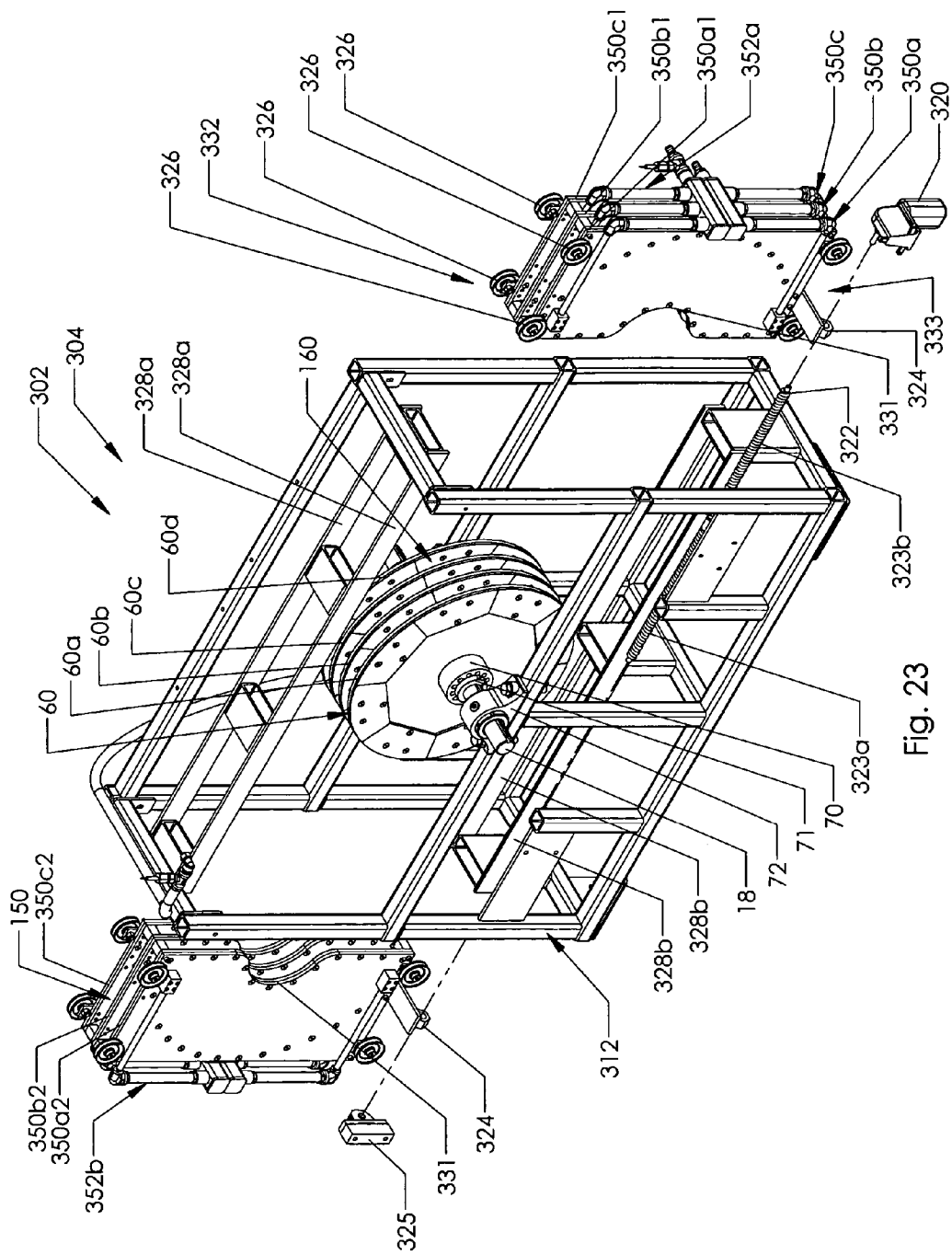
FIGS. 23, 24 and 25 are partially exploded and assembled perspective views, respectively, of a split-conductor magnetic heater assembly comprising a split-conductor magnetic heater and a frame, in accordance with an embodiment of the present invention.
Figure 24:
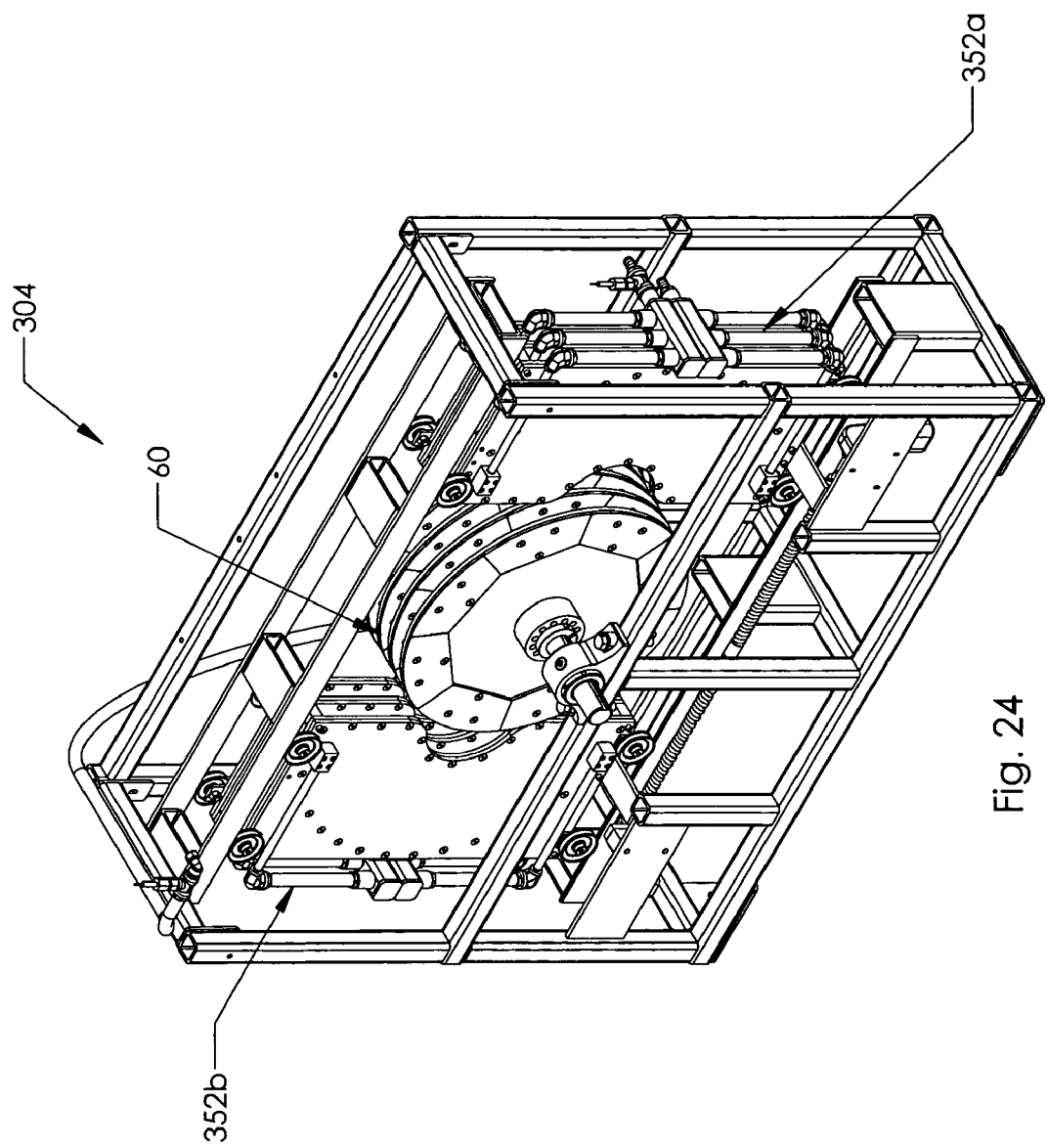
Figure 25:
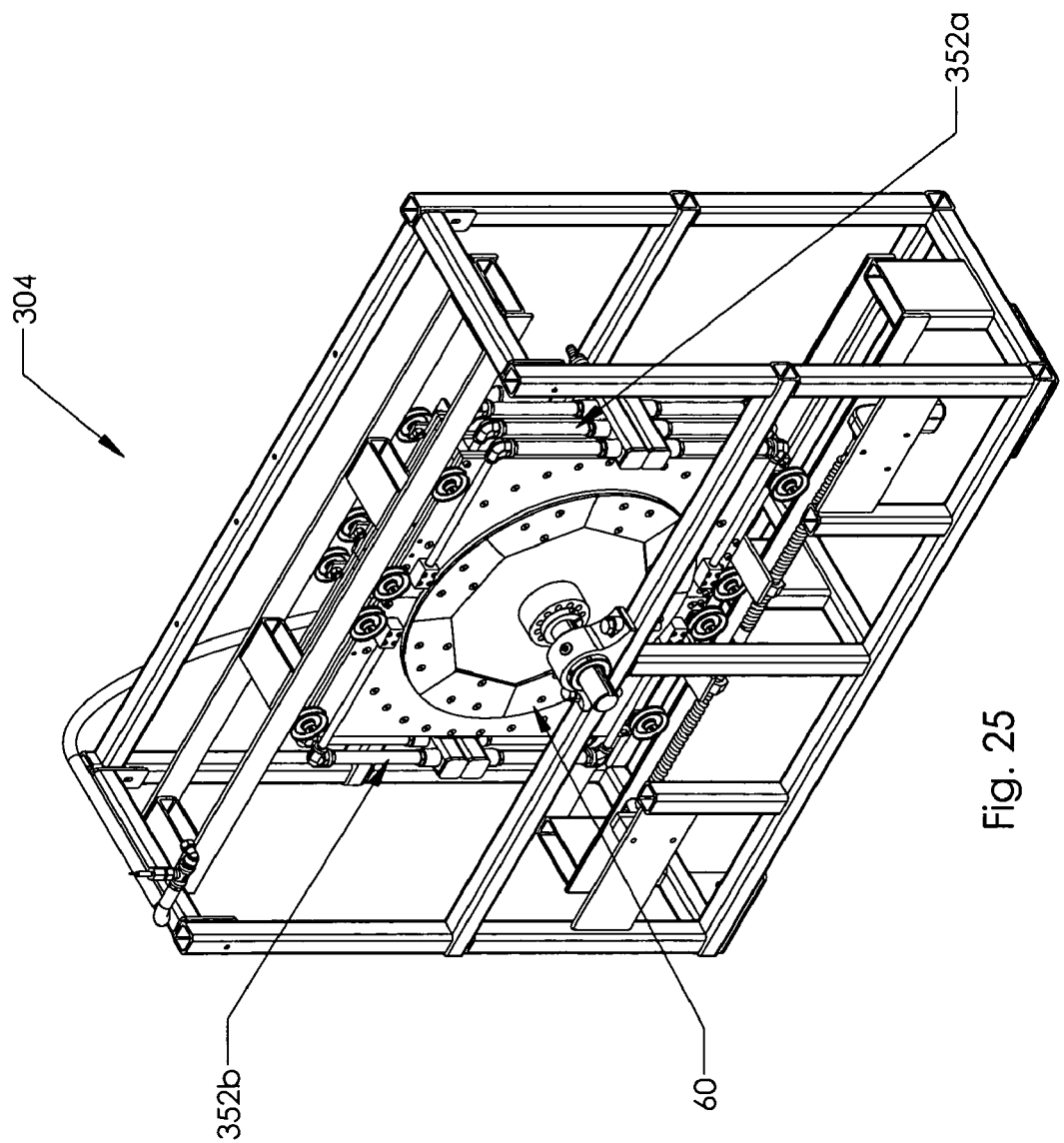

FIGS. 23, 24 and 25 are partially exploded and assembled perspective views, respectively, of a split-conductor magnetic heater assembly 302 comprising a split-conductor magnetic heater 304 and a frame 312, in accordance with an embodiment of the present invention. The frame 312 is adapted to support various elements of the split-conductor magnetic heater 304 as well as providing a platform for ancillary components of a larger system. The split-conductor magnetic heater 304 comprises a magnet unit 60 and a first half-conductor unit 352a and a second half-conductor unit 352b in opposing relationship to each other. The first and second half-conductor units 352a,b are adapted to move laterally into and out of magnet assembly spaces 160 defined by the magnet unit 60 and thus, moving the first and second half-conductor units 352a,b substantially into and out of magnetic engagement with the magnet unit 60, as will be explained below.

In the embodiment of FIG. 23, the magnet unit 60 comprises a first, second, third, and fourth magnet assembly 60*a-d* of substantially the same configuration as provided by the embodiment of the magnet assembly 60*a* of FIG. 19, though it is understood that any magnet assembly embodiment previously presented is suitable for the particular purpose. The magnet assemblies 60*a-d* are carried and driven in rotation by a drive shaft 18 which itself is supported by a pair of pillow blocks 72, and held together as an assembly by a plurality of bushings 70, collars 71, and the pillow blocks 72 (one shown), substantially similar to the embodiment of FIG. 18, though it is understood that other support and retention means are suitable for the particular purpose. The magnet assemblies 60*a-d* are spaced apart from each other a predetermined distance defining magnet assembly spaces 160, as previously presented and as will be explained further below. The magnet assemblies 60*a-d* are coupled to the shaft 18 and rotate relative to the first and second half-conductor units 352a,b when the shaft 18 is rotated. It is understood that in other embodiments in accordance with the present invention, the magnet unit 60 comprises one or more magnet assemblies suitable for a particular purpose and complementary to the first and second half-conductor units 352a,b.

The first and second half-conductor units 352a,b together define a first, second and third conductor assembly 350*a-c* each of which comprise a pair of two half-conductor assemblies: a pair of first half-conductor assemblies 350*a*1, 350*a*2, a pair of second half-conductor assemblies 350*b*1, 350*b*2, and a pair of third half-conductor assemblies 350*c*1, 350*c*2, respectively. The first half-conductor unit 352a comprises one half-conductor assembly of each pair of half-conductor assemblies coupled together in spaced-apart, parallel arrangement and the second half-conductor unit 352b comprises the other half-conductor assembly of each pair of half-conductor assemblies coupled together in spaced-apart, parallel arrangement. The first half-conductor unit 352a, therefore, comprises the first half-conductor assembly 350*a*1, the second half-conductor assembly 350*b*1, and the third half-conductor assembly 350*c*1, and the second half-conductor unit 352b comprises the first half-conductor assembly 350*a*2, the second half-conductor assembly 350*b*2, and the third half-conductor assembly 350*c*2. It is understood that in other embodiments in accordance with the present invention, the first and second half-conductor units 352*a,b* comprise one or more half-conductor assemblies suitable for a particular purpose and complementary to the magnet unit 60. The half-conductor assemblies 350*a*1,*a*2,*b*1,*b*2,*c*1,*c*2 comprise internal and external fluid handling means substantially similar to that described for the embodiment of FIG. 20.

The first and second half-conductor units 352*a,b* are adapted to translate transversely with respect to and on opposite sides of the axis of the drive shaft 18 between a first, disengaged position as shown in FIG. 24 and a second engaged position as shown in FIG. 25. The first and second half-conductor units 352*a,b* are adapted such that when translated towards the drive shaft 18, the corresponding pairs of half-conductor assemblies of each of the first, second and third conductor assemblies 350*a-c* translate substantially coplanar towards each other until substantially adjacent each other in edge-to-edge orientation with each half-conductor assembly translating at least partially into the space between respective magnet assemblies 60*a-d*.

The first and second half-conductor units 352*a,b* comprise a means for translating respective half-conductor assemblies into and out of the space between corresponding magnet assemblies. In the embodiment of FIG. 23, the first and second half-conductor units 352*a,b* comprise a plurality of slotted wheels 326: four wheels 326 on an upper side 332 of the first and second half-conductor units 352*a,b* wherein the wheels' axes of rotation are substantially coplanar; and four wheels 326 on the lower side 333 of the first and second half-conductor units 352*a,b* wherein the wheels' axes of rotation are substantially coplanar.

Two pairs of parallel tracks, upper tracks 238*a* and lower tracks 328*b*, are provided on the frame 312 and are adapted to accept and guide the wheels 326 on the upper side 332 and the lower side 333 of the first and second half-conductor units 352*a,b*, respectively. The tracks 328*a,b* are substantially parallel with respect to each other and substantially perpendicular to the orientation of the axis of the drive shaft 18. The upper tracks 238*a* are positioned on one side of the axis of the drive shaft 18 and the lower tracks 328*b* are positioned on the opposite side of the axis of the drive shaft 18. The axis of rotation of the wheels 326 is substantially parallel with the axis of rotation of the drive shaft 18. The wheels 326 of the first and second half-conductor units 352*a,b* are slidingly received onto opposite ends of the upper and lower tracks 328*a,b* and are adapted to translate along a portion of the length of the tracks 328, such that the first and second half-conductor units 352*a,b* may translate substantially perpendicular to the axis of rotation of the drive shaft 18.

The split-conductor magnetic heater assembly 302 further comprises a drive means suitable for driving the first and second half-conductor units 352*a,b* along the upper and lower tracks 328*a,b*. The drive means shown in FIG. 23 comprises a motor 320, a screw drive shaft 322, and screw-drive engagement element 324. The screw drive shaft 322 comprises a first shaft half 323a having threads of a first direction and a second shaft half 323b having threads of an opposite second direction. The screw drive shaft 322 is positioned parallel to the tracks 328 and perpendicular to the orientation of the axis of the drive shaft 18, such that the first and second shaft halves 323a,b are on opposite sides of the axis of the drive shaft 18.

The motor 320 is adapted to rotate the screw drive shaft 322 in a clockwise and counter-clockwise direction. Each screw-drive engagement element 324 is coupled to one of the first and second half-conductor units 352a,b and engaged with one of the first and second shaft halves 323a,b. The screw-drive shaft 322 is threadably engaged with the screw-drive engagement elements 324 and adapted such that when the screw-drive shaft 322 is rotated in a first direction, the first and second half-conductor units 352a,b are driven towards each other and towards the drive shaft 18, and when rotated in a second, opposite direction, the first and second half-conductor units 352a,b are driven away from each other and away from the drive shaft 18.

It is appreciated that one skilled in the art will recognize many other means for translating the first and second half-conductor units 352a,b. Such other means include, but are not limited to, pulleys, gears, linear actuators, pneumatic and hydraulic cylinders, among many others. It is also understood that the first and second half-conductor units 352a,b may be driven independently of each other by providing two drive means.

The length of the upper and lower tracks 328a,b and thus the distance of travel of the first and second half-conductor units 352a,b is predetermined to cover a range of travel such that at a first position, referred to as the disengaged position, the first and second half-conductor units 352a,b are positioned away from the magnet assembly 60 as shown in FIG. 24, wherein they are substantially not magnetically engaged therewith, to a second, engaged position, wherein the first and second half-conductor units 352a,b are interleaved with the magnet assembly 60, as shown in FIG. 25, where they are substantially magnetically engaged therewith.

The first, second, and third conductor assemblies 350a-c, and the first, second, third, and fourth magnet assemblies 60a-d are spaced apart a predetermined distance defining conductor assembly spaces 150 and magnet assembly spaces 160, respectively, such that in the engaged position, each of the first, second, and third conductor assemblies 350a-c are positioned in alternating, interleaved arrangement within the magnet assembly spaces 160 between the first, second, third, and fourth magnet assemblies 60a-d. Each of the half-conductor assemblies 350a1,a2,b1,b2,c1,c2 further comprise a half-circular aperture 331 so as to accommodate the drive shaft 18 and/or bushings therein and not interfere therewith when the first and second half-conductor units 352a,b are in the engaged position.

Magnetic engagement is defined as a conductor assembly at least partially under the influence of a magnetic field produced by a magnet assembly resulting when the conductor assembly and magnet assembly are at least partially in facing relationship. As discussed previously, the rotation of the magnet assembly adjacent the conductor assembly causes an eddy current to be set up in the conductor assembly due to the changing magnetic field produced by the movement of the magnets of the rotating magnet assembly. The current in the conductor assembly moves in such a way as to produce heat in the conductor assembly. The faster the magnet assembly is rotated, the stronger the currents induced in the conductor assembly and therefore the greater the heating of the conductor assembly.

The position of the first and second half-conductor units 352a,b relative to the magnet unit 60 will determine the amount of heating of the first and second half-conductor assemblies 352a,b, from a minimum in the disengaged position to a maximum in the engaged position. As the first and second half-conductor units 352a,b are translated over the range from the disengaged position to the engaged position, the amount of magnetic engagement with the magnet assemblies 60a-d is increased, increasing the heating of the half conductor assemblies 350a1,a2,b1,b2,c1,c2 and thus the fluid passing therein. By selectively positioning the first and second half-conductor units 352a,b along the upper and lower tracks 328a,b, the heating of the first and second half-conductor units 352a,b, and therefore the heat output of the magnetic heater 304, can be controlled independently from the speed of rotation of the drive shaft 18.

In other embodiments of the magnetic heater in accordance with present invention, the first and second half-conductor units 352a,b translate independently of each other, driven by separate drive means, providing various options for controlling heat output, such as, but not limited to, magnetically engaging or partially magnetically engaging one of the first and second half-conductor units 352a,b.

In yet other embodiments in accordance with the present invention, each of the first conductor assembly 350a, second conductor assembly 350b1, and third conductor assembly 350c, translate independently of each other, driven by separate drive means, providing various options for controlling heat output, such as, but not limited to, magnetically engaging or partially magnetically engaging one or more of the first, second and third conductor assembly 350a, 350b, 350c.

In yet other embodiments in accordance with the present invention, each of the half-conductor assemblies 350a1,a2, b1,b2,c1,c2, translate independently of each other, driven by separate drive means, providing various options for controlling heat output, such as, but not limited to, magnetically engaging or partially magnetically engaging one or more of the half-conductor assemblies 350a1,a2,b1,b2,c1,c2.

In yet other embodiments in accordance with the present invention, the magnetic heater comprises one or more conductor assemblies that are not limited to pairs of half-conductor assemblies. In an embodiment, each of the first conductor assembly 350a, second conductor assembly 350b1, and third conductor assembly 350c, comprises one conductor assembly having a slot extending through an edge to beyond the center of the conductor assembly so as to allow the passing of the drive shaft therein when the conductor assembly is translated between a disengaged and engaged position.

Figure 26:
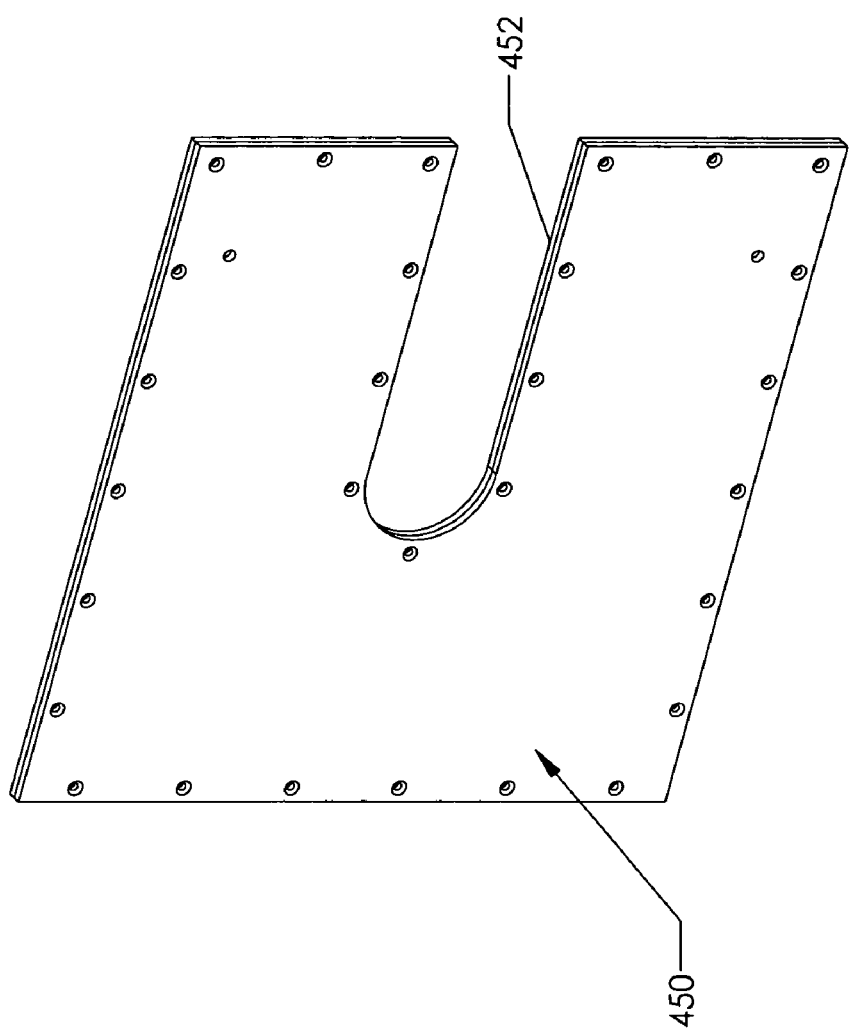
FIG. 26 is a perspective view of a conductor assembly comprising a slot, in accordance with the present invention.

FIG. 26 is a perspective view of a conductor assembly 450 comprising a slot 452, in accordance with the present invention. The slot 452 extends through an edge to beyond the center of the conductor assembly 450 so as to allow the passing of the drive shaft therein when the conductor assembly is translated between a disengaged and engaged position.

It can be appreciated by those skilled in the art that the feature of translating half-conductor units, conductor assemblies, and half-conductor assemblies can be extended to other magnetic heater embodiments that do not necessarily have working fluid traversing within the conductor, such as, but not limited to, the embodiments of FIGS. 1, 6, 7 and 10, wherein the conductors are conductive members 14 in the form of solid plates.

Figure 27:
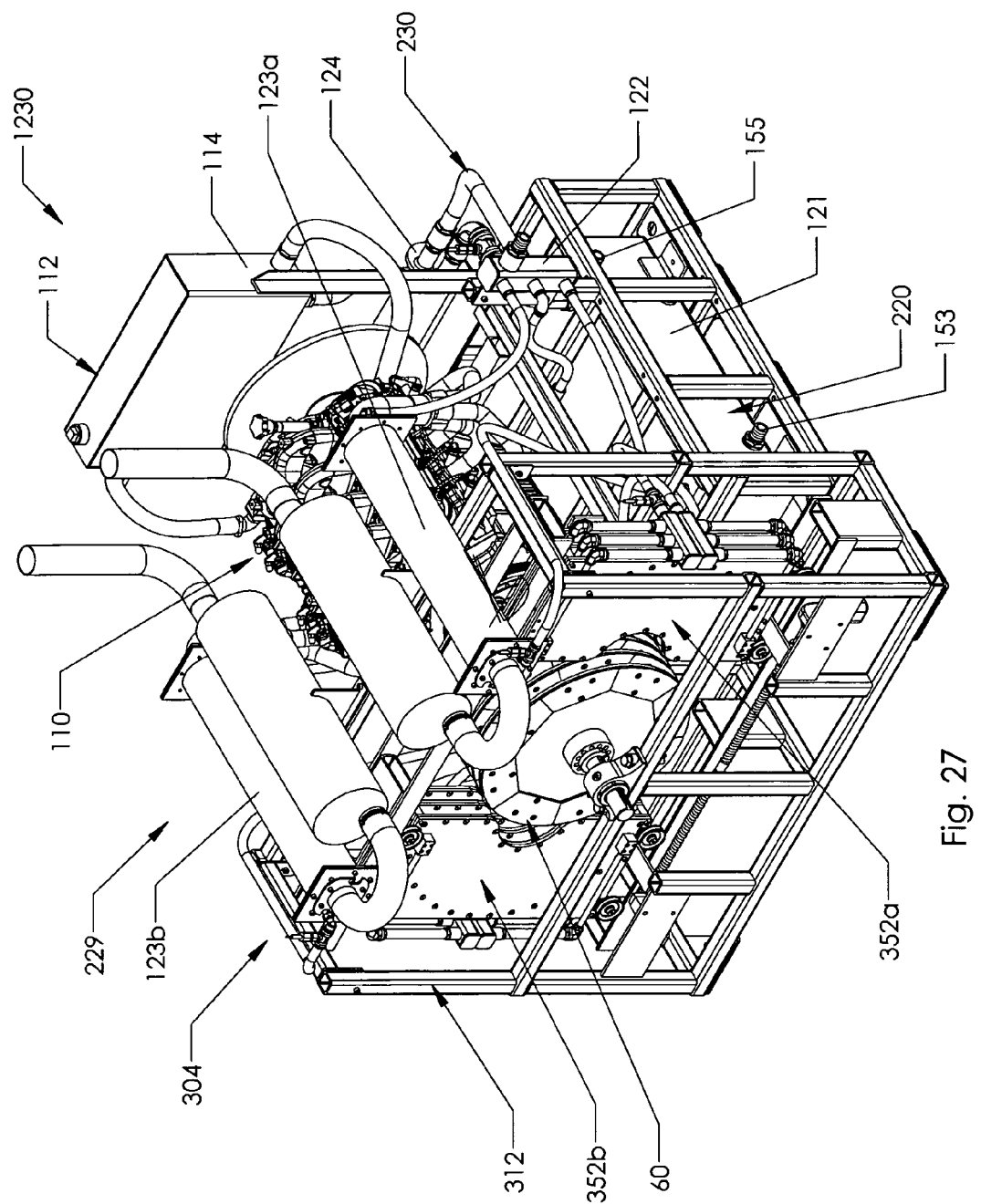
FIGS. 27, 28, and 29 are perspective, front and side views, respectively, of an engine-driven heat generation system, in accordance with an embodiment of the present invention.
Figure 28:
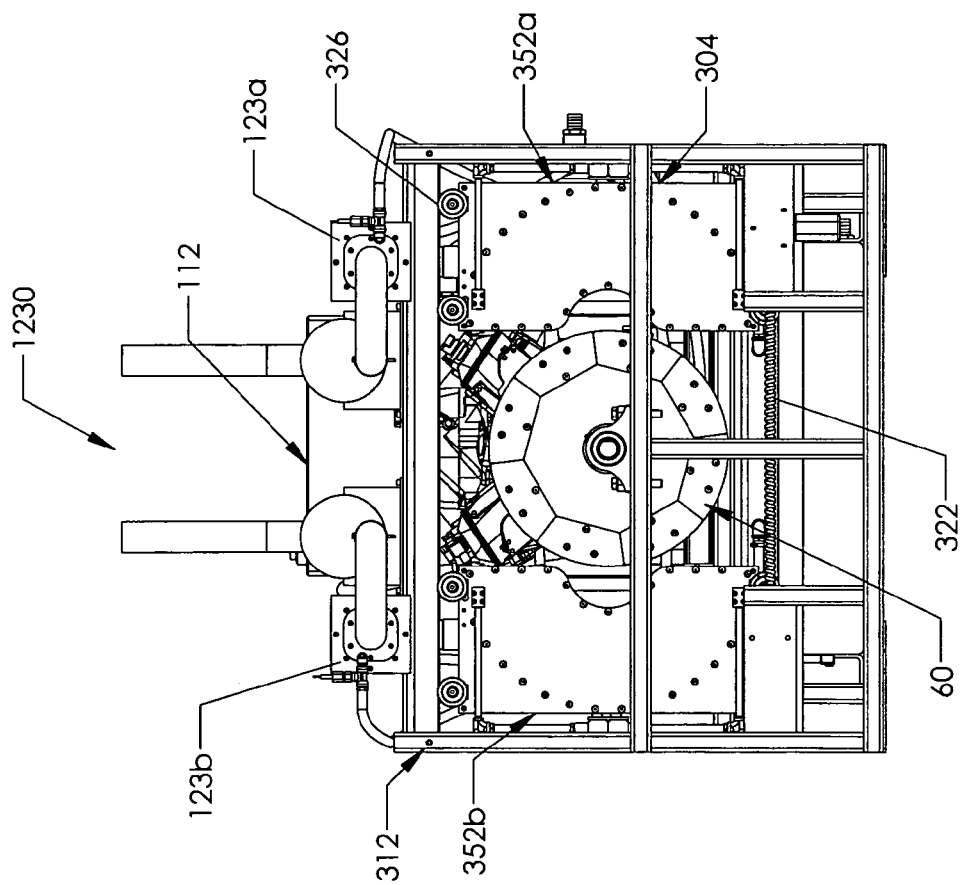
Figure 29:
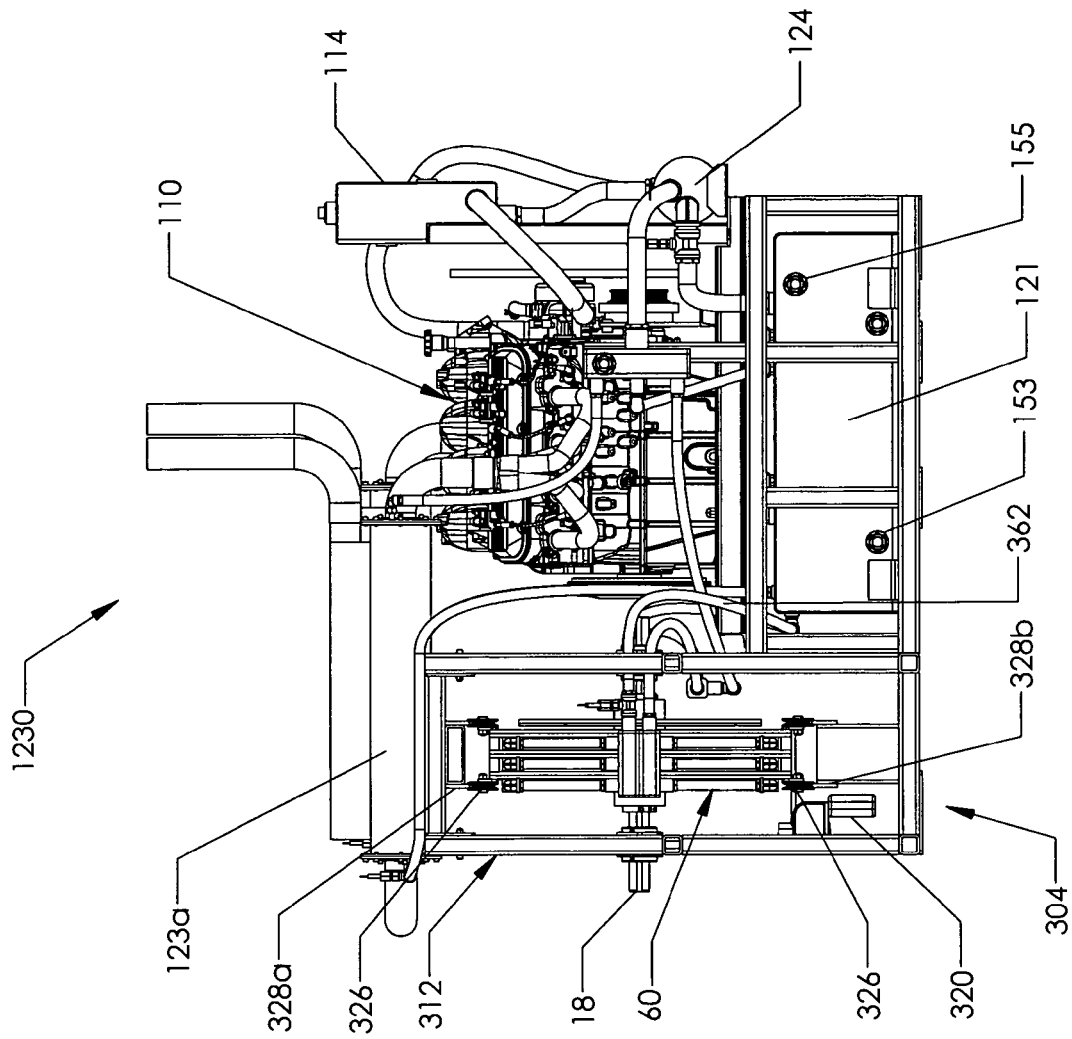

FIGS. 27, 28, and 29 are perspective front and side views, respectively, of an engine-driven heat generation system 1230, in accordance with an embodiment of the present invention. Referring again to FIG. 22, FIG. 22 is a schematic diagram of an embodiment of an engine-driven heat generation system 200 that is substantially similar to the engine-driven heat generation system 1230 of FIGS. 26, 27 and 28. The engine-driven heat generation system 1230 provides heat to external applications via a working fluid supplied to a suitable external heat exchanger 126 as previously described. The engine-driven heat generation system 1230 comprises an internal combustion engine 110, a magnetic heater 304, such as, but not limited to, the embodiment of FIG. 23, and a fluid handling system 230. A drive coupling (not shown) of the engine 110 drives or rotates the drive shaft 18 and therefore the magnet unit 60 within the magnetic heater 304 which in turn heats the first and second half-conductor units 352$a,b$ when magnetically engaged. In FIGS. 26, 27 and 28, the first and second half-conductor units 352$a,b$ are in the non-engaged position for clarity. When magnetically engaged in the engaged position, the first and second half-conductor units 352$a,b$ are heated, which in turn, heats the working fluid flowing therein.

The position of the first and second half-conductor units 352$a,b$ relative to the magnet unit 60 will determine the amount of heating of the working fluid inside of the half conductor assemblies 350$a1,a2,b1,b2,c1,c2$, from a minimum in the disengaged position to a maximum in the engaged position. As the first and second half-conductor units 352$a,b$ are translated from the disengaged position to the engaged position, the amount of magnetic engagement with the magnet unit 60 is increased, increasing the heating of the working fluid. By selectively positioning the first and second half-conductor units 352$a,b$ along the upper and lower tracks 328$a,b$, the heating of the first and second half-conductor units 352$a,b$, and therefore the heat output of the magnetic heater 304 via the working fluid, can be controlled independent of the speed of rotation of the drive shaft 18.

The fluid handling system 230 comprises a working fluid handling system 220, an engine cooling system 112, and an exhaust system 229. The working fluid handling system 220 comprises a fluid reservoir 121, a manifold flow control 122, a pair of exhaust heat exchangers 123$a,b$, a coolant heat exchanger 124, and one or more circulating pumps (not shown), all in fluid communication adapted to circulate the working fluid therein. The manifold flow control 122 is adapted to direct the working fluid to the half conductor assemblies 350$a1,a2,b1,b2,c1,c2$ of the magnetic heater 304, among other components. The fluid reservoir 121 further comprises a supply coupling 155 and return coupling 153 for coupling in fluid communication with a remote heat exchanger (not shown).

The heat generated by the magnetic heater 304 is transferred to the working fluid passing within the first and second half-conductor units 352$a,b$. The first and second half-conductor units 352$a,b$ are coupled to the fluid reservoir 121 and manifold flow control 122 via flexible hoses 362 that are adapted to accommodate for the movement of the first and second half-conductor units 352$a,b$. The external manifold (not shown) is adapted to provide one or more fluid take-offs to supply the heated working fluid to one or more external heat exchangers (not shown) previously described in reference to FIG. 22, and return cooled working fluid to the fluid reservoir 121.

The engine cooling system 112 comprises a coolant reservoir 114 for a coolant fluid in fluid communication with the engine 110 and the coolant heat exchanger 124. The manifold flow control 122 is also adapted to direct the working fluid to the coolant heat exchanger 124. The coolant fluid circulates within the engine 110, wherein the heat from the structure of the engine 110 is transferred to the coolant fluid and subsequently transferred to the working fluid in the coolant heat exchanger 124. The coolant heat exchanger 124 is coupled to the manifold flow control 122 and the fluid reservoir 121. In this way, the heat from the engine 110 as well as the heat from the magnetic heater 304 is used to heat the working fluid.

The engine 110 produces hot exhaust gas as a product of combustion which is directed external to the engine 110 by an exhaust manifold 128 (not shown in FIGS. 26-28). The exhaust system 229 comprises a pair of exhaust heat exchangers 123$a,b$ which are in fluid communication with the exhaust manifold 128 and are adapted to transfer the heat from the exhaust of the engine 110 to the working fluid. The manifold flow control 122 is also adapted to direct the working fluid to the exhaust heat exchangers 123$a,b$ which in turn directs the working fluid to the fluid reservoir 121. In this way, the heat from the exhaust, heat from the engine coolant, as well as the heat from the magnetic heater 304 is used to heat the working fluid.

It is appreciated that a variety of configurations of an engine-driven heat generation system may be utilized, depending on engineering design preferences and constraints.

The feature of being able to translate the first and second half-conductor units 352$a,b$ into and out of magnetic engagement with the magnet assembly 60 provides a number of significant advantages. One advantage is in terms of drive performance at start up. Where the conductor assemblies are not translatable with respect to the magnet assemblies, at all times, but particularly at engine startup, the conductor assemblies are magnetically engaged with the magnet assemblies, that is, the magnet assemblies are magnetically attracted to the conductor assemblies. The engine at startup must therefore overcome the magnetic attraction between the conductor assembly and the magnet assemblies that occurs in the rest state, referred to as startup torque, requiring a larger engine torque to overcome the startup torque. Where the first and second half-conductor units 352$a,b$ are disengaged from the magnet assembly 60 at startup, as provided in accordance with the embodiments of the present invention and as shown in FIG. 26, there is no magnetic torque for the engine to overcome at startup and therefore, a smaller engine with a lower torque may be used.

As discussed previously, the rotation of the magnet assembly adjacent the conductor assembly causes an eddy current to be set up in the conductor assembly due to the changing magnetic field produced by the movement of the magnets of the rotating magnet assembly. In accordance with Lenz's law, the current in the conductor assembly moves in such a way as to create a magnetic field opposing the changing magnetic field produced by the movement of the magnets, resulting in producing heat in the conductor assembly, but also producing a resistance to rotation, referred herein as magnetic torque, against which the drive means rotating the magnet assembly must work against (this discussion neglects the magnetic attraction of the conductor assembly to the magnet assembly experienced whether the magnet assembly is rotating or not). The faster the magnet assembly is rotated, the stronger the currents induced in the conductor assembly and therefore the stronger the magnetic torque which must be overcome.

The magnetic torque is an important consideration when specifying the drive means for rotating a particular magnet assembly having a predetermined magnetic field strength to a predetermined rotation speed. Wherein the magnet assemblies is coupled directly to the engine drive shaft and that the conductor assemblies are always magnetically engaged with and not translatable with respect to the magnet assemblies, the drive means must be able to produce sufficient torque to overcome the magnetic torque from rest to the desired rotation speed. An efficient configuration would provide a drive means capable of producing slightly more torque than what is required for the range of rotation speed. This is not easy to achieve for many drive means.

To explain further by way of example, an internal combustion engine of a given size may have a torque versus rotation speed curve that does not match the magnetic torque versus rotation speed curve for the magnetic heater. One of the engine or magnetic torques may have a greater slope of the torque versus rotation speed curve and/or the slope is not linear. A particular engine may have a preferred speed at which it operates efficiently and safely, for example 2400 RPM (revolutions per minute). Assume that the magnet assembly is directly coupled to the engine drive shaft and that the conductor assemblies are always magnetically engaged with and not translatable with respect to the magnet assemblies. As the engine speed increases to a certain rotation speed for a particular engine/magnetic heater configuration, a speed that is below the preferred speed of 2400 RPM, say 1200 RPM, the magnetic torque becomes the same as the engine torque, at which point the engine will stall.

One way to overcome the stall condition is to provide a clutch on the drive shaft between the engine and the magnet assembly, the clutch adapted to engage and start the rotation of the magnet assembly after the engine attains a rotation speed above 1200 RPM so as to prevent the magnet torque from ever being the same or greater than the engine torque and thus prevent the engine from stalling. The clutch could be provided that engages the magnet assembly at the preferred rotation speed, 2400 RPM in this example, but a clutch capable of handling higher speeds and greater engine torques are large, heavy and expensive. The use of a clutch that engages the magnet assembly below the preferred rotation speed is likely to cause a mismatch of engine torque to magnetic torque at the preferred engine speed of 2400 RPM due to the mismatched torque versus rotation speed curves, and thus the system will be less efficient as the engine will be producing excess torque.

Another way to overcome the stall condition is to provide an engine that supplies engine torque that is always greater than the magnetic torque over the range up to the preferred rotation speed. Again, it is likely that there will be a greater mismatch of engine torque to magnetic torque at the preferred engine speed of 2400 RPM and thus the system will be less efficient.

Another way to overcome the stall condition as well as the inefficient operation at the preferred rotation speed is to provide a magnetic heater comprising a movable conductive assembly and having a magnetic torque optimally matched to the engine torque at the preferred rotation speed of the engine, and magnetically engaging the conductor assembly with the magnet assembly at a rotation speed greater than any rotation speed that would produce a magnetic torque equal to or greater than the engine torque that would cause the engine to stall, in accordance with a method of the present invention. In the above example, the conductor assembly would engage the magnet assembly at a rotation speed above 1200 RPM sufficient to prevent the rotation speed from falling below the rotation speed required to maintain an engine torque greater than the magnetic torque. At the lower rotation speeds, the conductor assembly would be in the disengaged position wherein there is no magnetic engagement between the conductor assembly and the magnet assembly. At a predetermined rotation speed above which the engine torque is always greater than the magnetic torque, the conductor assembly is brought into magnetic engagement with the magnet assembly.

In accordance with embodiments of the methods of the present invention, a split-conductor magnetic heater 304 of the embodiment of FIG. 23 is adapted to provide a magnetic torque that is optimized for efficient operation of a chosen engine, that is, a magnetic torque less than but closely approaching the engine torque at the preferred operating speed of the engine. The engine is started and brought up to the preferred speed with the first and second half-conductor units 352$a,b$ in the disengaged position. The first and second half-conductor units 352$a,b$ are then translated to the engaged position. At shut-down, the first and second half-conductor units 352$a,b$ are translated to the disengaged position, and the engine is shut down.

Further, by virtue of the ability of translating the first and second half-conductor units 352$a,b$ into and out of magnetic engagement with the magnet unit 60, the heat output can be varied without changing the speed of the engine 110. Therefore the engine 110 can be driven at its optimal speed and the heat output of the magnetic heater 304 can be controlled by the drive means translating the first and second half-conductor units 352$a,b$ into a predetermined amount of magnetic engagement with the magnet unit 60.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

Persons skilled in the art will recognize that many modifications and variations are possible in the details, materials, and arrangements of the parts and actions which have been described and illustrated in order to explain the nature of this invention and that such modifications and variations do not depart from the spirit and scope of the teachings and appended claims contained.

We claim:

1. A magnetic heater, comprising:
   a drive shaft having an axis;
   one or more conductor assemblies comprising an electrically conductive material adapted to enable inductive heating within the conductor assembly when exposed to a time-varying magnetic flux, the one or more conductor assemblies are adapted to translate transversely with respect to the axis of the drive shaft between a first, disengaged position and a second engaged position;
   one or more magnet assemblies comprising one or more magnets, each magnet assembly aligned along the axis about the drive shaft, wherein each magnet assembly is adapted to dispose the one or more magnets in close proximity to the conductor assembly, each magnet assembly coupled to the drive shaft adapted such that the magnet assembly rotates relative to the conductor assembly when the drive shaft is caused to rotate, wherein the magnet assembly is adapted to provide time-varying magnetic flux to the conductor assembly when moved relative thereto; and
   means for translating the one or more conductor assemblies transversely with respect to and on opposite sides of the axis of the drive shaft between the first, disengaged position and the second engaged position, into and out of opposing, spaced apart facing relationship with the magnet assemblies and therefore into and out of magnetic engagement therein.

2. The magnetic heater of claim 1, wherein each conductor assembly comprises a first half-conductor assembly and a second half-conductor assembly in opposing relationship to each other, the first and second half-conductor assemblies adapted to translate transversely with respect to and on opposite sides of the axis of the drive shaft towards and away from each other and into and out of opposing, spaced apart facing relationship with respective magnet assemblies.

3. The magnetic heater of claim 1, wherein each conductor assembly comprises a slot extending from an edge to about a center of the conductor assembly, the slot adapted to accept the drive shaft therein, each conductor adapted to translate transversely with respect to the axis of the drive shaft towards and away from each other and into and out of opposing, spaced apart facing relationship with respective magnet assemblies, disposing the drive shaft within the slot.

4. The magnetic heater of claim 1, wherein each conductor assembly comprises a pair of conductor plates defining a fluid space there between, the fluid space in fluid communication with a fluid inlet and a fluid outlet adapted to allow the flow of fluid through the fluid space, at least one of the conductor plates comprise an electrically conductive material adapted to enable induced eddy-currents within the at least one conductor plate when exposed to a time-varying magnetic flux, wherein the fluid space is adapted to provide heat transfer from the conductor plates to the fluid as the conductor plates are heated during operation.

5. The magnetic heater of claim 1, wherein the one or more magnet assemblies comprises a first, second, third, and fourth magnet assembly defining a magnet unit, the magnet assemblies being spaced apart from each other a predetermined distance defining magnet assembly spaces, wherein the one or more conductor assemblies comprises a first conductor assembly comprising a pair of first half-conductor assemblies, a second conductor assembly comprising a pair of second half-conductor assemblies, and a third conductor assembly comprising a pair of third half-conductor assemblies, wherein a first half-conductor unit comprises one half-conductor assembly of each pair of half-conductor assemblies coupled together in spaced-apart, parallel arrangement and a second half-conductor unit comprises the other half-conductor assembly of each pair of half-conductor assemblies coupled together in spaced-apart, parallel arrangement, the first and second half-conductor units adapted to translate transversely with respect to the axis of the drive shaft between a first, disengaged position and a second engaged position, the first, second, and third conductor assemblies, and the first, second, third, and fourth magnet assemblies are spaced apart a predetermined distance defining conductor assembly spaces and magnet assembly spaces, respectively, such that in the engaged position, each of the first, second, and third conductor assemblies are positioned in alternating, interleaved arrangement within the magnet assembly spaces between the first, second, third, and fourth magnet assemblies.

6. The magnetic heater of claim 1, wherein the conductor assemblies comprise a plurality of slotted wheels on an upper side and a lower side of the conductor assemblies;
the magnetic heater further comprising two pairs of parallel upper tracks and parallel lower tracks, the upper and lower tracks substantially parallel with respect to each other and substantially perpendicular to the orientation of the axis of the drive shaft, the upper tracks located on one side of the axis of the drive shaft and the lower tracks are located on the opposite side of the axis of the drive shaft, the upper and lower tracks adapted to slidingly receive and guide the slotted wheels in translation along a portion of the length of the tracks such that the conductor assemblies may translate substantially perpendicular to the axis of rotation of the drive shaft.

7. The magnetic heater of claim 5, wherein the first and second half-conductor units comprise a plurality of slotted wheels on an upper side and a lower side of the first and second half-conductor units; the magnetic heater further comprising two pairs of parallel upper tracks and parallel lower tracks, the upper and lower tracks substantially parallel with respect to each other and substantially perpendicular to the orientation of the axis of the drive shaft, the upper tracks located on one side of the axis of the drive shaft and the lower tracks are located on the opposite side of the axis of the drive shaft, the upper and lower tracks adapted to slidingly receive and guide the slotted wheels in translation along a portion of the length of the tracks such that the first and second half-conductor units may translate substantially perpendicular to the axis of rotation of the drive shaft towards and away from each other.

8. The magnetic heater of claim 7, further comprising a drive means comprising:
a motor;
a screw drive shaft; and
at least one screw-drive engagement element, the screw drive shaft comprises a first shaft half having threads of a first direction and a second shaft half having threads of an opposite second direction, the screw drive shaft located parallel to the tracks and perpendicular to the orientation of the axis of the drive shaft such that the first and second shaft halves are on opposite sides of the axis of the drive shaft, the motor adapted to rotate the screw drive shaft in a clockwise and counter-clockwise direction, each screw-drive engagement element coupled to one of the first and second half-conductor units and engaged with one of the first and second shaft halves, the screw-drive shaft threadably engaged with the screw-drive engagement elements and adapted such that when the screw-drive shaft is rotated in a first direction, the first and second half-conductor units are driven towards each other and towards the drive shaft, and when rotated in a second, opposite direction, the first and second half-conductor units are driven away from each other and away from the drive shaft.

9. The magnetic heater of claim 7, wherein the first and second half-conductor units are driven independently of each other by two drive means.

10. The magnetic heater of claim 8, wherein the length of the upper and lower tracks and thus the distance of travel of the first and second half-conductor units is predetermined to cover a range of travel such that at a first position, disengaged position, the first and second half-conductor units are positioned away from the magnet assembly, wherein they are substantially not magnetically engaged therewith, to a second, engaged position, wherein the first and second half-conductor units are interleaved with the magnet assembly, where they are substantially magnetically engaged therewith.

11. The magnetic heater of claim 5, wherein each of the half-conductor assemblies further comprise a half-circular aperture about an edge adapted to accommodate the drive shaft therein and not interfere therewith when the first and second half-conductor units are in the engaged position.

12. The magnetic heater of claim 1, wherein each magnet assembly comprises:
a magnet plate in the form of a substantially circular disk, a plurality of magnet pockets disposed on a side of the magnet plate and at a predetermined distance adjacent a magnet plate peripheral edge, the plurality of magnet pockets adapted to at least partially receive at least one magnet therein;

at least one magnet at least partially disposed within each magnet pocket; and at least one retainer plate coupled to the magnet plate coupling the magnet within the magnet pocket.

13. A magnetic heater, comprising:

a drive shaft having an axis;

one or more conductor assemblies comprising an electrically conductive material adapted to enable inductive heating within the conductor assembly when exposed to a time-varying magnetic flux, the one or more conductor assemblies are adapted to translate transversely with respect to the axis of the drive shaft between a first, disengaged position and a second engaged position;

one or more magnet assemblies comprising one or more magnets, each magnet assembly aligned along the axis about the drive shaft, wherein each magnet assembly is adapted to dispose the one or more magnets in close proximity to the conductor assembly, each magnet assembly coupled to the drive shaft adapted such that the magnet assembly rotates relative to the conductor assembly when the drive shaft is caused to rotate, wherein the magnet assembly is adapted to provide time-varying magnetic flux to the conductor assembly when moved relative thereto, the one or more conductor assemblies operable to move transversely with respect to and on opposite sides of the axis of the drive shaft between the first, disengaged position and the second engaged position, into and out of opposing, spaced apart facing relationship with the magnet assemblies and therefore into and out of magnetic engagement therein.

14. The magnetic heater of claim 13, wherein each conductor assembly comprises a first half-conductor assembly and a second half-conductor assembly in opposing relationship to each other, the first and second half-conductor assemblies operable to translate transversely with respect to and on opposite sides of the axis of the drive shaft towards and away from each other and into and out of opposing, spaced apart facing relationship with respective magnet assemblies.

15. The magnetic heater of claim 13, wherein each conductor assembly comprises a slot extending from an edge to about a center of the conductor assembly, the slot adapted to accept the drive shaft therein, each conductor operable to translate transversely with respect to the axis of the drive shaft towards and away from each other and into and out of opposing, spaced apart facing relationship with respective magnet assemblies, disposing the drive shaft within the slot.

16. The magnetic heater of claim 13, wherein each conductor assembly comprises a pair of conductor plates defining a fluid space there between, the fluid space in fluid communication with a fluid inlet and a fluid outlet so as to allow the flow of fluid through the fluid space, at least one of the conductor plates comprise an electrically conductive material adapted to enable induced eddy-currents within the at least one conductor plate when exposed to a time-varying magnetic flux, wherein the fluid space is adapted to provide heat transfer from the conductor plates to the fluid as the conductor plates are heated during operation.

17. The magnetic heater of claim 13, wherein the one or more magnet assemblies comprises a first, second, third, and fourth magnet assembly defining a magnet unit, the magnet assemblies being spaced apart from each other a predetermined distance defining magnet assembly spaces, wherein the one or more conductor assemblies comprises a first conductor assembly comprising a pair of first half-conductor assemblies, a second conductor assembly comprising a pair of second half-conductor assemblies, and a third conductor assembly comprising a pair of third half-conductor assemblies, wherein a first half-conductor unit comprises one half-conductor assembly of each pair of half-conductor assemblies coupled together in spaced-apart, parallel arrangement and a second half-conductor unit comprises the other half-conductor assembly of each pair of half-conductor assemblies coupled together in spaced-apart, parallel arrangement, the first and second half-conductor units operable to translate transversely with respect to the axis of the drive shaft between a first, disengaged position and a second engaged position, the first, second, and third conductor assemblies, and the first, second, third, and fourth magnet assemblies are spaced apart a predetermined distance defining conductor assembly spaces and magnet assembly spaces, respectively, such that in the engaged position, each of the first, second, and third conductor assemblies are positioned in alternating, interleaved arrangement within the magnet assembly spaces between the first, second, third, and fourth magnet assemblies.

18. The magnetic heater of claim 13, wherein the conductor assemblies comprise a plurality of slotted wheels on an upper side and a lower side of the conductor assemblies, the magnetic heater further comprising two pairs of parallel upper tracks and parallel lower tracks, the upper and lower tracks being substantially parallel with respect to each other and substantially perpendicular to the orientation of the axis of the drive shaft, the upper tracks located on one side of the axis of the drive shaft and the lower tracks are located on the opposite side of the axis of the drive shaft, the upper and lower tracks slidingly receive and guide the slotted wheels in translation along a portion of the length of the tracks such that the conductor assemblies translate substantially perpendicular to the axis of rotation of the drive shaft.

19. The magnetic heater of claim 17, wherein the first and second half-conductor units comprise a plurality of slotted wheels on an upper side and a lower side of the first and second half-conductor units, the magnetic heater further comprising two pairs of parallel upper tracks and parallel lower tracks, the upper and lower tracks are substantially parallel with respect to each other and substantially perpendicular to the orientation of the axis of the drive shaft, the upper tracks are located on one side of the axis of the drive shaft and the lower tracks are located on the opposite side of the axis of the drive shaft, the upper and lower tracks slidingly receive and guide the slotted wheels in translation along a portion of the length of the tracks such that the first and second half-conductor units translate substantially perpendicular to the axis of rotation of the drive shaft towards and away from each other.

20. The magnetic heater of claim 19, further comprising a drive means comprising:

a motor;

a screw drive shaft; and at least one screw-drive engagement element, the screw drive shaft comprises a first shaft half having threads of a first direction and a second shaft half having threads of an opposite second direction, the screw drive shaft located parallel to the tracks and perpendicular to the orientation of the axis of the drive shaft such that the first and second shaft halves are on opposite sides of the axis of the drive shaft, the motor adapted to rotate the screw drive shaft in a clockwise and counter-clockwise direction, each screw-drive engagement element coupled to one of the first and second half-conductor units and engaged with one of the first and second shaft halves, the screw-drive shaft is operably threadably engaged with the screw-drive engagement elements such that when the screw-drive shaft is rotated in a first direction, the first and second half-conductor units are driven towards each other and towards the drive shaft, and when rotated in a second, opposite direction, the first and second half-conductor units are driven away from each other and away from the drive shaft.

21. The magnetic heater of claim 19, wherein the first and second half-conductor units are driven independently of each other by two drive means.

22. The magnetic heater of claim 20, wherein the length of the upper and lower tracks and thus the distance of travel of the first and second half-conductor units is predetermined to cover a range of travel such that at a first, disengaged position, the first and second half-conductor units are positioned away from the magnet assembly, wherein they are substantially not magnetically engaged therewith, to a second, engaged position, wherein the first and second half-conductor units are interleaved with the magnet assembly, where they are substantially magnetically engaged therewith.

23. The magnetic heater of claim 17, wherein each of the half-conductor assemblies further comprise a half-circular aperture about an edge adapted to accommodate the drive shaft therein and not interfere therewith when the first and second half-conductor units are in the engaged position.

24. The magnetic heater of claim 13, wherein each magnet assembly comprises:
  a magnet plate in the form of a substantially circular disk, a plurality of magnet pockets disposed on a side of the magnet plate and at a predetermined distance adjacent a magnet plate peripheral edge, the plurality of magnet pockets adapted to at least partially receive at least one magnet therein, at least one magnet at least partially disposed within each magnet pocket; and
  at least one retainer plate coupled to the magnet plate coupling the magnet within the magnet pocket.

* * * * *